Sept. 20, 1960 J. C. BAKER 2,953,460
PROCESS AND APPARATUS FOR PREPARING DOUGH
Original Filed Aug. 3, 1950 6 Sheets-Sheet 4
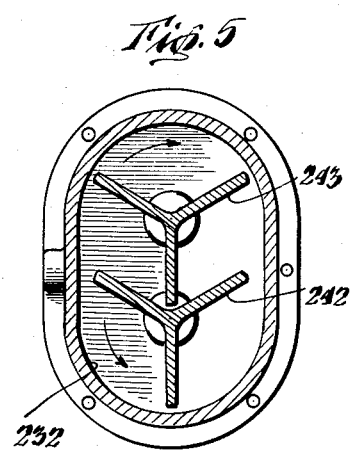
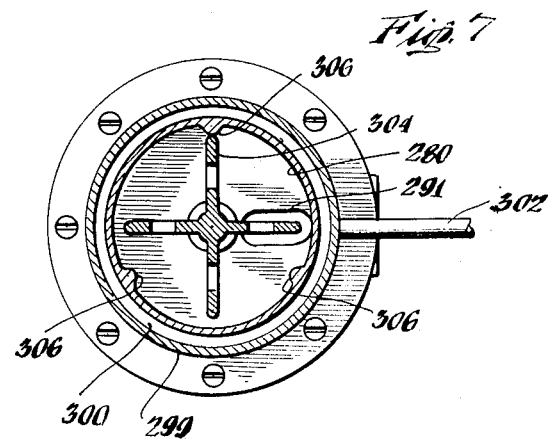
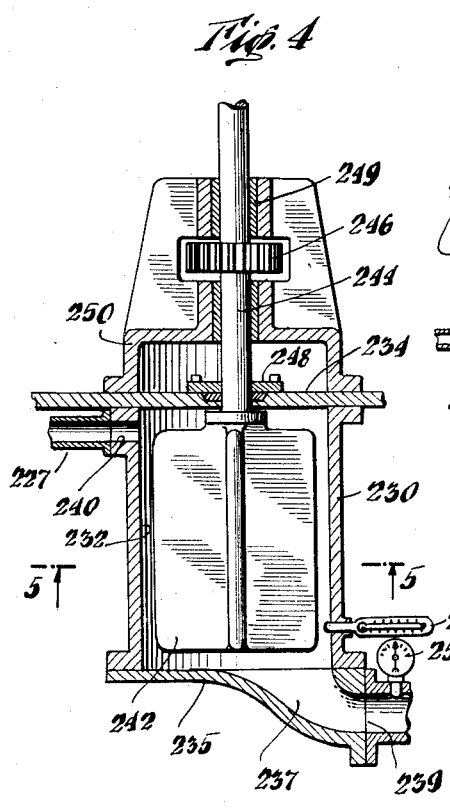
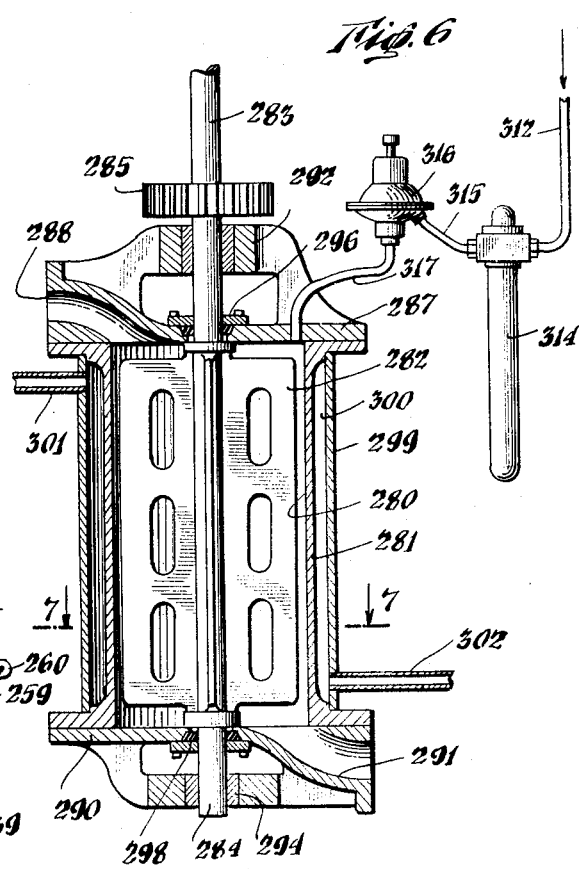
INVENTOR.
John C. Baker
BY
Robert S. Dunham
ATTORNEY

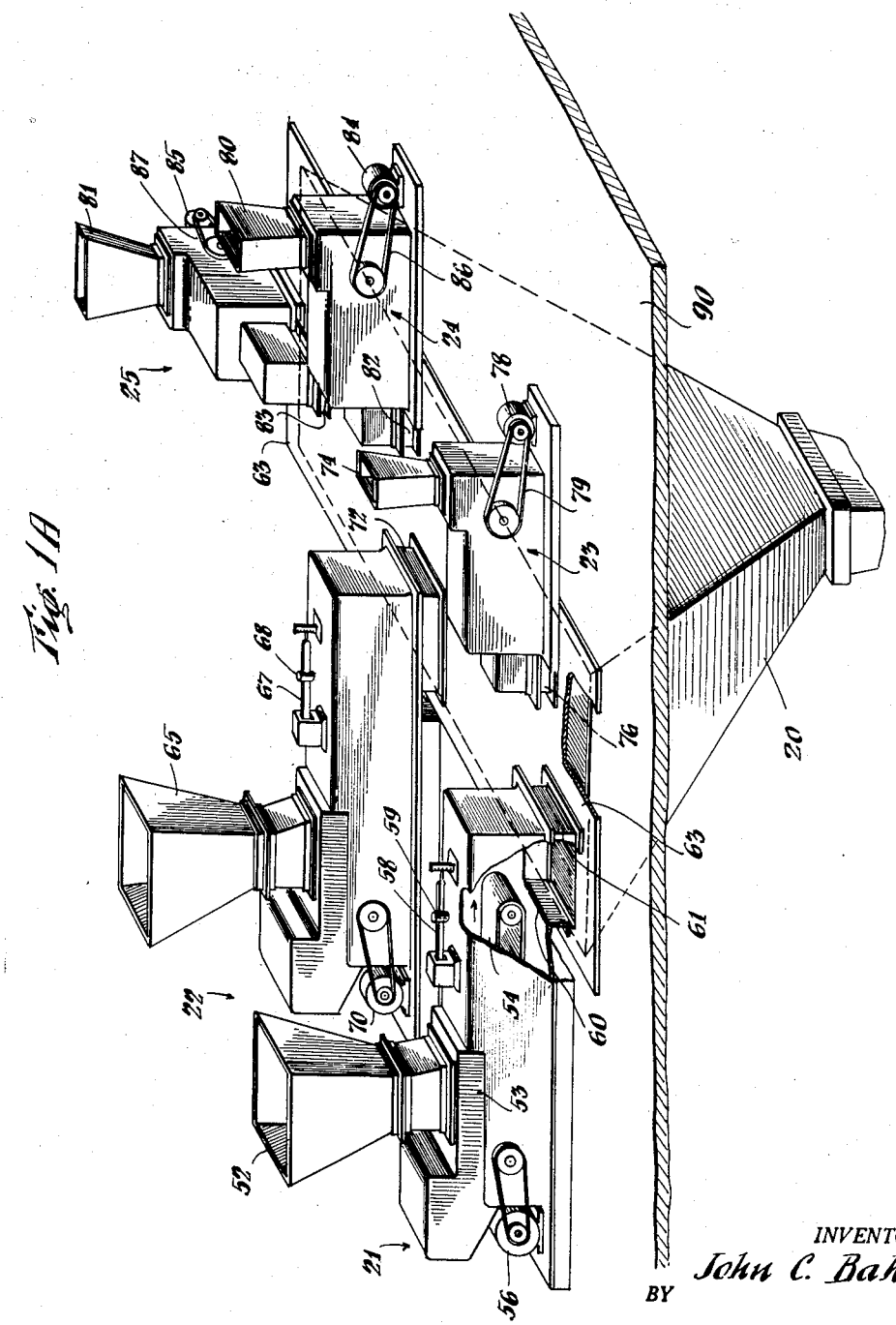

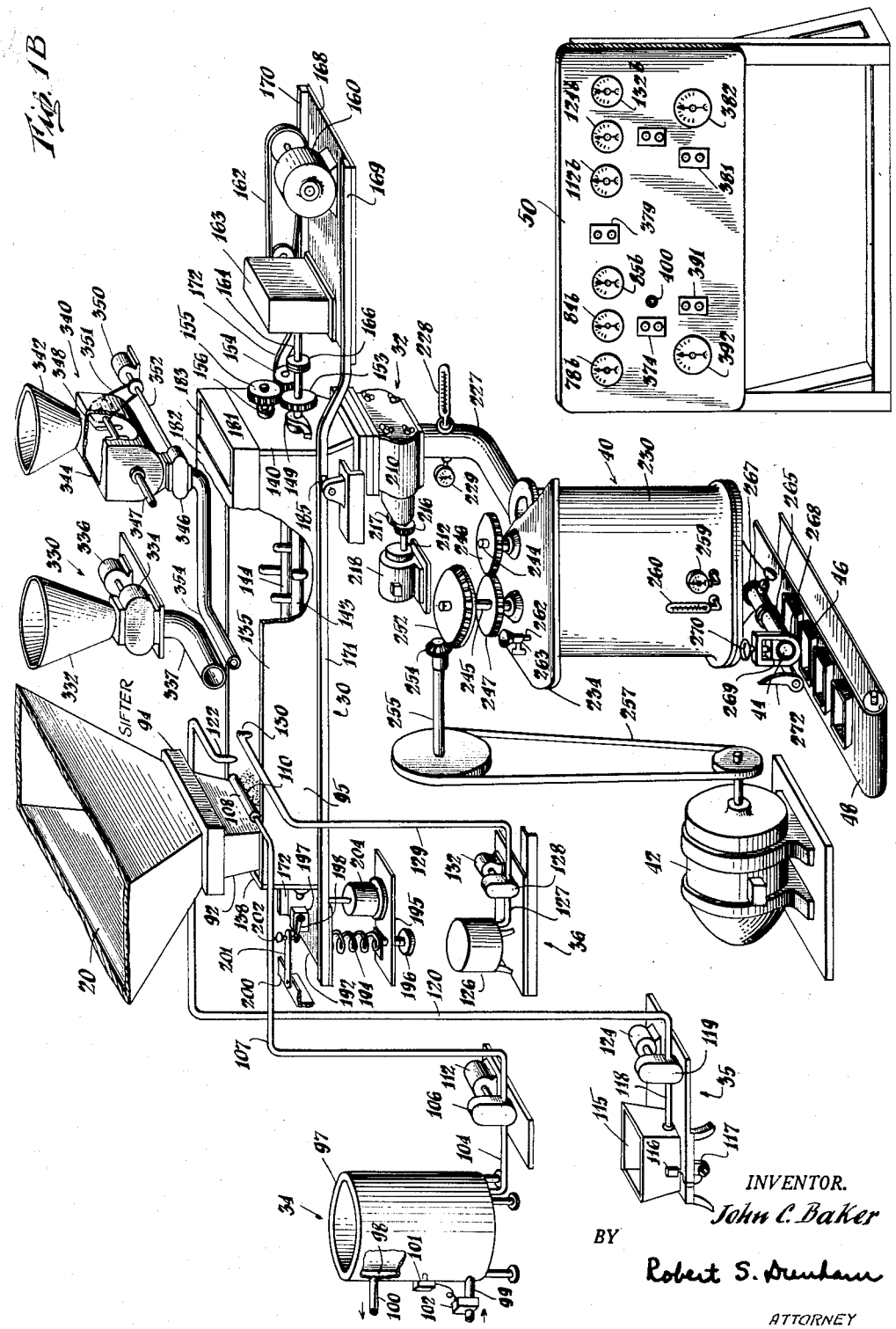

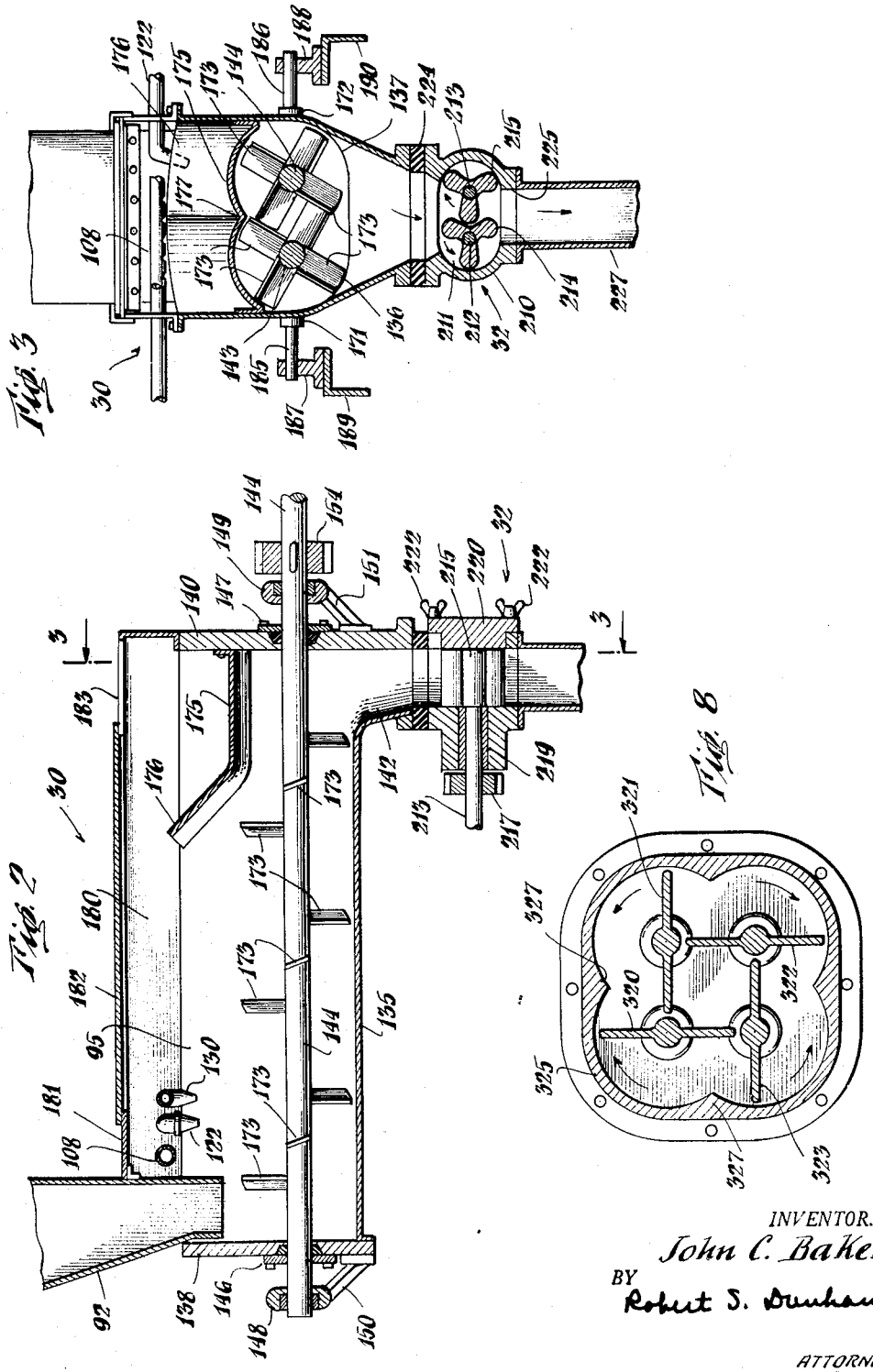

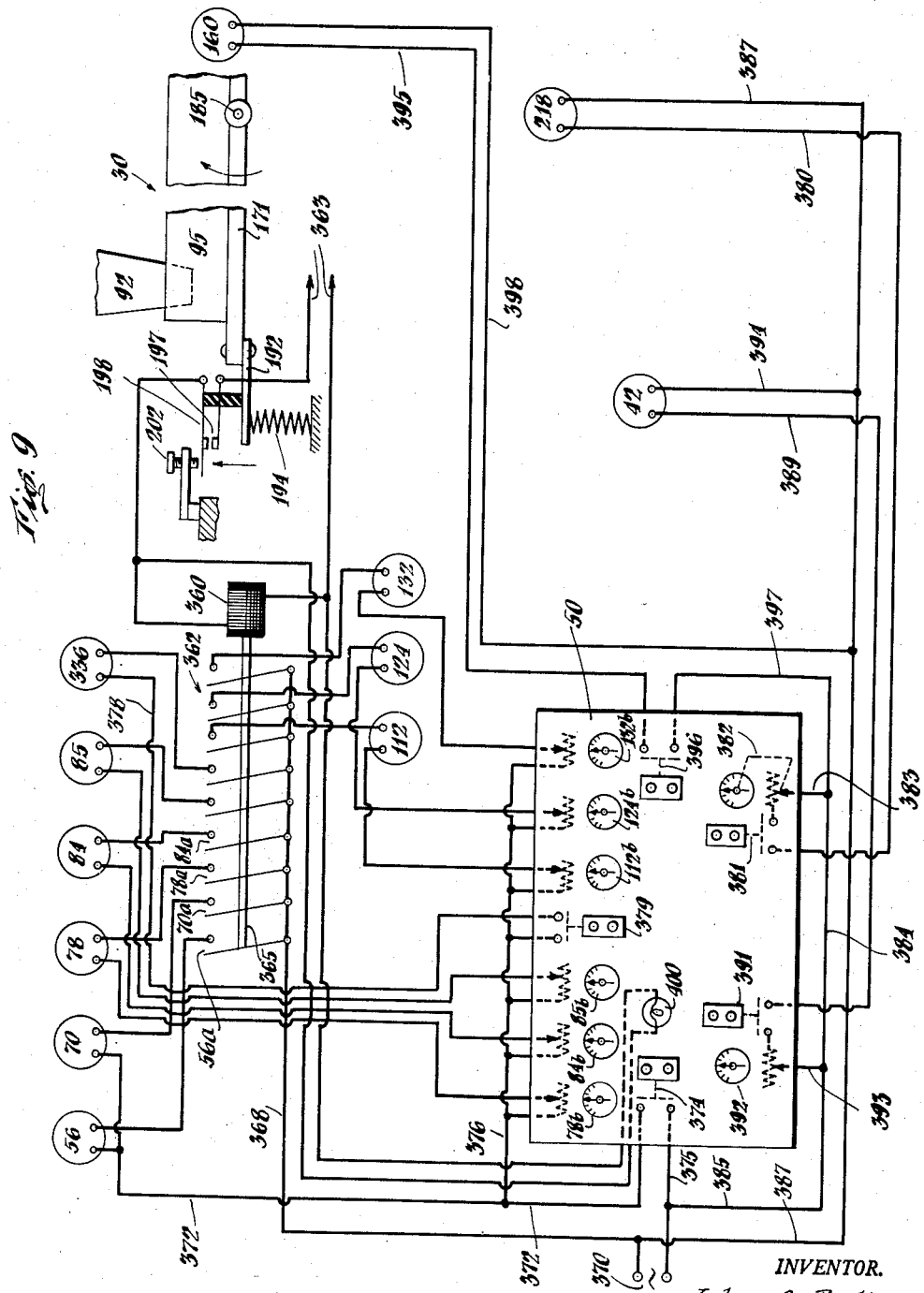

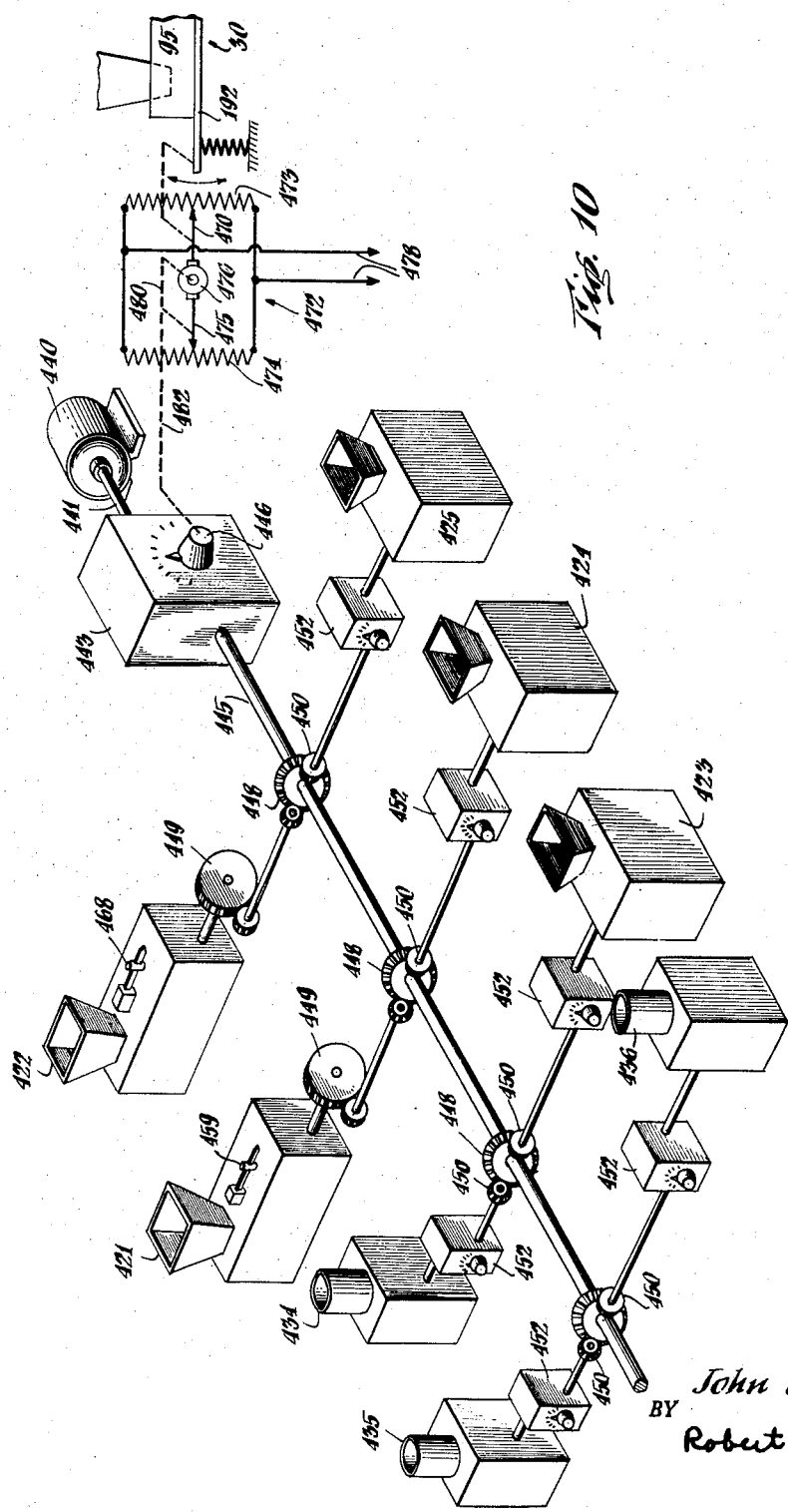

United States Patent Office 2,953,460
Patented Sept. 20, 1960

2,953,460
PROCESS AND APPARATUS FOR PREPARING DOUGH

John C. Baker, Alhambra, Calif., assignor to Baker Process Company, Belleville, N.J., a corporation of New Jersey Continuation of application Ser. No. 177,418, Aug. 3, 1950. This application July 23, 1959, Ser. No. 828,928

39 Claims. (Cl. 99—90)

In commercial and like practice of the art of baking, the manufacture of bread dough has customarily involved a complex and time-consuming series of operations, which include certain critically slow and discontinuous steps, and require an elaborate lay-out of equipment. It has long been recognized that the conditions of dough manufacture, up to the point where the proofed loaf is delievered to the oven, are extremely critical, i.e. for the attainment of a finished bread or like product having desired characteristics of texture, freshness, grain or cell size, moisture content, flavor and the like. Not only the character of the ingredients but also the manner, extent, time and temperature of processing operations, including various stages of mixing, fermenting, dividing, other manipulating and proofing, affect the character of the finished bread, and do so in ways which have been learned only in an empirical manner; hence the proper regulation of the process is apt to depend very largely on the training and experience of attendant personnel. Furthermore, in order to achieve quantity production and uniformity of size and weight of the product by mechanization, various extra or supplemental steps have had to be adopted, either to facilitate the functioning of dividing, panning, and other machines or to correct undesirable effects which such equipment has on the dough.

While many proposals have been made for theoretically continuous procedures of dough manufacture, they have, so far as I am aware, failed to take account of the peculiar requirements of dough mixtures and have been unsuccessful, either operationally or product-wise, in comparison with the customary manual or batch-type production methods. The attainment of a satisfactory dough is not a simple matter of mixing of ingredients, or of simply allowing sufficient time for the operations of fermentation and expansion; unlike the production of various batters, cake mixes, certain biscuit and piecrust doughs, and other types of batters and doughs, plastic, yeast-leavened dough adapted to be baked into an essentially soft-boiled, cellular product, e.g. bread, has not heretofore been successfully made by any sort of continuous mixing operation, i.e. wherein by a continuous feed of unmixed or at least partly unprepared ingredients, a continuous yield of essentially finished dough is obtained. Indeed, equipment and procedures which might be suitable for making batters, baking-powder doughs, and the like in a continuous manner have only yielded bread doughs which are undeveloped, have badly varying characteristics, and are unsatisfactory, to the extent that the resulting bead is unduly heavy or coarse or greatly irregular in cell structure or is otherwise deficient in texture, crumb, flavor and like qualities.

Genarally speaking, two chief methods have been heretofore employed for the commercial production of bread, both requiring mixing and other preparations of a batch-type and both involving costly and elaborate systems through which the dough must be handled before it is ultimately panned and delivered to the oven. In the so-called straight dough method, a batch containing all of the components (viz. flour, water, yeast, salt and minor ingredients) is first mixed in a standard dough mixer, until a dough of preliminarily suitable development is reached. In such mixing, the mass is essentially unconfined and the mixing chamber, though closed, is customarily only partially filled so that the mixing arms may accomplish the kneading and interfolding that has been considered desirable. Thereafter the dough is deposited, in large batches, in the usual troughs and allowed to ferment or expand for a period of several hours.

From the troughs, after full fermentation, the dough is next supplied to a so-called divider, where it is forced through appropriate structure and separated into successive pieces or lumps, each corresponding in quantity to an ultimate loaf. The divided pieces of dough then pass through a so-called rounder, which shapes each piece to a more compact and ball-like configuration. The mechanical compression and distortion of the developed dough by these devices has a seriously deleterious effect on its grain or cell structure, so that the divided and rounded pieces are next allowed to rest for a short proofing period, say of fifteen minutes to one-half hour, usually achieved by conveying the dough pieces very slowly through a so-called overhead proofer. During such step, free gas is further generated or released from solution in the dough. From the overhead proofer the dough pieces with their free gas content fully reestablished are passed through the molder, which not only shapes the dough for deposit in the pans but works each piece to restore the fine subdivision and uniform dispersion of the gas cells and also to restore the so-called development of the dough, i.e. to establish optimum resilience, stiffness, smoothness and cell-retaining ability.

After molding, the pieces are deposited in the baking pans and transferred to an enclosed proofer, for an hour or so of final proofing. During this stage the dough increases greatly in volume and if it has been properly developed, the gas cells are uniformly enlarged from very minute size to about one-half the magnitude sought in the ultimate loaf. The proofed dough in the pans is finally delivered to the oven, wherein the actual baking takes place, converting the dough into loaves of bread, usually with some further enlargement or expansion. As will be more fully explained below, the so-called development represents a condition of the dough which is achieved only by a precisely suitable mixing or working and which provides an essentially elastic, strong, firm dough structure that will properly retain the gas cells as they expand in proofing and that will provide cell walls of the desired tenderness, firmness, resilience and crumb characteristics in the finished bread.

The second of the present commercial procedures of dough manufacture is the so-called sponge method, wherein a portion of the components, usually consisting of water, part of the flour, all of the yeast and usually at least some of the improving agent or agents, are first mixed to a dough, usually lacking salt and certain other ingredients. The mixing, in large batches, is primarily for the purpose of combining ingredients and is usually only of an extent necessary for obtaining dough of uniform composition; such mixing is performed in essentially the same way as for the "straight" dough described above, except the mixing is not carried to the desired, empirically judged extent of development. After fermentation in troughs for several hours, each batch of the then completed sponge is mixed with the remaining components, i.e. the balance of the flour and and water, and supplemental ingredients such as salt, sugar, milk and shortening, to form a bread dough. This second mixing or developing operation is carried on in a similar manner to the first, but is continued until a more or less fully developed dough is obtained. If desired, the batches of complete dough may have a further fermentation time, in troughs. In any case, the complete dough is thereafter processed in the same manner as in the straight dough method, i.e. through the divider, rounder, overhead proofer, molder, panner, and final proofer, to the oven.

Although to some extent more complex, the sponge dough method has certain advantages, in that it is usually easier to control for uniformity of bread quality, and in that the flavoring and other effects of long fermentation are obtained with the sponge, which represents only about half of the finished dough. It will be understood that the flavor usually desired in bread stems mainly from non-gaseous fermentation products, which unlike the gas, can ordinarily only be obtained by a long fermentation period of yeast-containing dough or sponge.

In both of these methods, the length of time of the mixing operation is regulated to produce a desired stage of dough development, corresponding to the baker's judgment. Usually, his aim in actual mixing is to develop the dough only to a partial extent, so that the subsequent, improving action of the fermentation and of the oxidizing agent or agents (usually bromate) will be complete at the time of baking. In current commercial practice of the methods just described the judgment of the baker as to the timing of mixing, fermentation and oxidation, in relation to the character of the flour and the proportions of ingredients, constitutes an important and critical factor.

A chief object of the present invention is to provide for the continuous manufacture of bread dough in a satisfactory and practical manner, e.g. so as to deliver a continuous and constant stream or flow of fully mixed and properly developed dough, which if desired is ready for baking after only the simplest of further operations. A further object is to overcome the serious deficiencies, of one sort or another, which appear to have characterized previous attempts to reach a continuous process of bread dough manufacture.

Another object of the invention is to provide an improved method whereby a thoroughly satisfactory bread dough may be produced, not only continuously but with unusual uniformity and with much fewer steps and operations than heretofore necessary in bakery practice. An additional object is to provide improved procedure and apparatus whereby bread, and specifically bread dough, may be manufactured at greatly reduced cost, the improved operations requiring much less equipment and much less space for equipment, and likewise requiring less time and power and involving considerably less work and attention by personnel. A like and further object is to afford an increase in bakery capacity, i.e. by enlarging very materially the output which may be had with a bakery plant of a given size.

A notably important object of the invention is the provision of a dough making system and method whereby the characteristics of the bread may be easily controlled within a wide range of variation, e.g. as to grain size or structure, texture and other qualities, the control being such as to be readily reproduced in successive runs of the equipment and also such as to permit remarkable uniformity of the product with any selected set of characteristics. Thus for instance bread of finer or coarser grain, as well as bread of the presently customary grain size may be more readily produced than is possible with present baking systems.

Further, specific objects of the invention are to afford a more efficient or effective system and procedure for the handling of soft and sticky doughs, which are desirable for certain types of bread and which present difficulty in conventional equipment, especially in the usual molder; to provide improved procedure whereby soft breads may be made without addition of special softening agents; and to afford a reduction in the cost of bread manufacture by facilitating the use of certain grades or types of flour which are fully satisfactory from the standpoint of flavor, purity and nutrient value and yet which because of their tendency to form sticky doughs are less adaptable to satisfactory process in the present forms of bakery equipment. Yet another object is to afford a dough-making system and procedure which will dispense with one or more, and preferably all of certain steps and devices in the conventional practice, e.g. the customary batch mixer, divider, and the rounder, overhead proofer and molder, and their functions or operations. The conventional equipment just mentioned requires the use of substantial quantities of oil and dusting flour in its operation; a further object of the invention is to reduce very greatly the amount of these materials needed, e.g. in that the presently preferred operation of my process will require little or none of such materials.

An additional object is the provision of an effective system and procedure for the complete processing of dough in closed or covered apparatus where the dough is neither touched by the hands of operators nor subjected to air-borne contamination such as may occur during transportation or storage in open equipment.

In a more specific sense a particularly significant object is the provision of an improved, practical and easily controlled process which is entirely continuous to the point of depositing loaf-size sections of dough in the pans for the sole further steps of final proofing and baking, such continuity of operation involving continuous mixing of ingredients and continuous conversion into dough of final and critically satisfactory development, to yield a continuously discharged or extruded stream of dough which is simply separated and deposited in pans. The entire process is thus most advantageously designed for a continuous flow of the ingredients, to prodce the dough, at a predetermined, constant rate which may be directly governed by the capacity of the ovens, so that there is no time-consuming or wasteful delay at any stage in the entire manufacturing operation.

To these and other ends, my improved process involves certain novel but inherently simple operations or combinations of steps, of a character cooperatively selected in accordance with what are believed to be new concepts of dough manufacture. While in some part or to a limited extent some of the underlying principles may have been separately recognized as related to one or another of the attributes of a properly mixed and developed dough, the basic concepts of the present process, and the practical coordination and realization of their fundamental principles are believed to be novel. In any event it is to be understood that the new and practical value of the procedure and apparatus herein described has been abundantly demonstrated in fact and is not necessarily dependent on any theoretical considerations, new or old.

More specifically, the preferred operations of the present invention involves essentially two stages of mixing or treatment advantageously arranged for the continuous, substantially uninterrupted, linear advance of the dough material at a constant, predeterminable rate through the first stage and thence to and through the second, provision being made to keep the rates of travel (through the successive stages) equal or balanced, e.g. by suitable adjustment, usually of the input. To the first of these stages, the dough ingredients can be continuously introduced in readily controlled proportions, e.g. either essentially unmixed ingredients such as the entire quantity of dry flour, salt, sugar, milk values, shortening, oxidants and yeast-type leavening, or ingredients such as employed in the complete mixing stage of the sponge process, viz. pre-established sponge, together with additional flour, water, salt and other supplemental components. In the first mixing stage of my process, the ingredients are advantageously mixed together in an unconfined state, i.e. in an open mixer or a mixer otherwise devoid of compression on the mass and arranged to permit free communication with the atmosphere or other avenue of gas release. This mixing operation is arranged to produce uniform results in the passing material, but is preferably limited to such mixture as will fully wet and combine all of the components and form a substantially homogeneous, lump-free dough which is as yet essentially undeveloped.

In this step any releasably trapped gas is allowed to escape freely, for example air or other gas that might be trapped in the dry flour. A feature of particular importance for the subsequent treatment of the dough mass is that (as continuously delivered by the first stage) it have uniform density, especially a uniform and preferably a uniformly low gas content. A peculiarly effective way of achieving uniform density is to perform the first step in such way, as with the material in an unconfined state and by avoiding folding or overlapping of the mass, that as much air or gas is freed as is possible in simple mixing, and none is further entrapped. Indeed the low gas content which uniformly characterizes the dough pre-mixed in this manner, is especially advantageous for the second stage of the process; it simplifies control of the latter, and permits readier achievement of an unusually fine-textured bread, or bread of otherwise homogeneous porosity.

From the first stage, the now pre-mixed and homogeneous but substantially undeveloped dough is advanced, preferably continuously and at once, to the second stage, which involves passing the dough continuously through a confined region while there subjecting it to a further mixing, i.e. a working, to develop it. To accomplish this operation, the pre-mixed dough may be continuously advanced through a closed vessel or container, which is substantially filled by the dough and in which, under presently preferred conditions, a positive pressure is maintained in or on the plastic fluid dough mass. Continuous mixing action is exerted on the dough as it advances through the confined space, this mixing action being of the nature of a working of the dough and being set or otherwise regulated to provide the desired measure of development, e.g. complete conversion of the dough to the developed structure and character necessary to permit subsequent processing and baking of the dough without substantial further mixing. A particular feature of the second mixing stage is that the dough may be advanced at a constant rate, for instance the same as through the preliminary mixing step, so that throughout a given run the developed dough is always discharged at a single, predetermined rate, which is measurable, because of the uniformity of the dough, in terms of weight per unit of time.

In accordance with a special and greatly preferred concept of the invention, the dough is advanced to, through and out of the developing chamber by means separate from the mixing elements, as by a pump which receives the pre-mixed material from the first step and continuously propels it into and through the chamber at a determined, constant rate. The mixing elements may then be such as to have no appreciable effect on the rate of travel of the dough from inlet to outlet of the chamber, making possible the extremely useful feature of regulating the extent of development of the dough by regulation of the rate of working, viz. by adjustment or setting of the speed of the mixing elements. Indeed the control of development in this and other ways (as explained further below) which may be wholly independent of the time of development, and which may thus allow the entire dough mixing operation to proceed continuously at a constant rate determined by extraneous requirements of production speed, contributes very significantly to the practical advantage of my process, and has not, so far as I am aware, heretofore been appreciated or realized in commercial dough manufacture.

From this second mixing, or working stage the dough is discharged in a uniformly developed condition, preferably such that it can be immediately panned and subjected to final proofing and baking without any other operation whatever. While the usual steps of dividing, rounding, intermediate proofing and molding, or some of them, can be retained, present experience with the process is that they may in most cases be essentially or entirely obviated. With the rate of advance of the ingredients and dough through both mixing stages set at a predetermined value, coordinated with the operating capacity of the baking ovens, a truly continuous bakery procedure is afforded. In these and other respects, including the saving of transport and handling time for batches of dough, the entire practice of bread manufacture is enormously speeded up.

Further aspects of the invention may be better understood in the light of a consideration of certain principles and effects of dough mixing or working. Thus it has been recognized that mixing operation upon a bread dough (e.g. in a conventional, open mixer) causes a progressive change in its properties which is evidenced by a progressive increase of the power required to maintain operation of the mixing elements at a selected rate. As mixing continues over a period of time, this increase in power continues to a predetermined peak value, after which the power requirement decreases. The actual time at which the power peak occurs differs rather widely with different flours and compositions of dough.

Hence for a given dough mixture with a given type of flour, a curve of power against time may be plotted, showing a peak or maximum at which the dough is said to be fully developed, in that it there reaches a condition generally believed to be optimum for ultimate baking into bread. Fully but not over-developed dough appears to be most suitable for retention of the gas cells as they expand during proofing, and also provides the texture and crumb characteristics usually considered best in bread. If the mixing or working of the dough (the term "working" being used herein to describe mixing or agitating operation of such character as will effect development of the dough) continues well beyond the power peak, the cell-retaining ability is impaired and the resulting bread is apt to have non-uniform and other properties that are customarily deemed inferior. Instruments are available for determining the power-time curve with samples of dough, as a guide for bakery operation.

As stated, the length of mixing time necessary (in ordinary types of mixing operation) for optimum development, varies with different flours as well as other conditions and characteristics of the mix. For example, so-called strong flours usually require a longer mixing time than weak flours. When less water is employed, the mixing period may ordinarily be shorter. In present, commercial bakery practice, the effect of these variables is taken into account chiefly by changing the length of the mixing period, and to a certain extent, also by varying the amount of fermentation permitted to occur in the mixed dough. The necessity for changing these times, particularly the mixing time, for different lots of flour and other changes of condition has (along with the cumbersome nature of the mixing and fermentation steps) militated against the attainment of a truly continuous process of dough manufacture, i.e. a process that can be operated to deliver dough at a constant, predetermined rate for which subsequent equipment, especially the ovens, can be set.

It has been explained above that the term "development" refers to a change occurring, with continuing mixing, in the physical properties of the plastic (non-gaseous) material constituting the dough mixture, and that full development can be measured as an optimum ability of the dough to retain gas cells in subsequent processing and baking. A substantially undeveloped dough appears granular, has little strength and breaks short when pulled or stretched. Gas cells in such dough, whether arising by liberation of gas from solution in the dough (including carbon dioxide gas appearing in solution by the fermentation process) or by occlusion from an external source, cannot be held in uniform, small, segregated volumes. It will be understood that during proofing or other standing of a loaf-size portion of a mixed, fermenting dough, the gas content of the loaf increases very greatly, so that if minute gas cells were present at the outset, they tend to become much larger. In the case of greatly under-developed dough, the cell volume increase is very irregular many of the cells breaking and opening into others, so that the resultant baked loaf has a non-uniformity of cell structure, including many large, open cells, with heavy or overly firm wall structure between them.

In the case of proper or peak development, the dough material acquires a smooth, extensible quality with reduced stickiness and greater strength, so that the cell walls can stretch without breaking when further gas is released into them. The cells thus tend to remain much more uniform in size and to avoid coalescence; hence for a given extent of expansion in subsequent proofing, the total number of cells is greatest and the size of each smallest, in a fully developed portion of dough. The cell wall in the finished bread is thin, and the bread has a soft crumb. Finally, however, when dough is greatly over-developed, i.e. has been mixed well past the optimum development stage, it is not only very smooth in appearance but also extremely sticky and soft, and is extensible to the point of weakness, so that the cell walls are too fluid and prevent the dough from holding the subsequent enlarging gas cells or bubbles in place. In the resulting bread, great irregularity of cell structure occurs, which a predominance of large and non-uniform cells at the uppermost part of the loaf, indicating that the gas has migrated upward and that the material has failed to retain a desirable uniformity of cell structure. Again, the texture and consistency of the solid part of the finished bread is also apt to be unsatisfactory, e.g. lacking desirable opacity and crumb quality.

It will be understood that references herein to peak or maximum development of dough mean the condition of the dough (whether recognized by mixing-resistance tests or by baking tests or by other criteria) when it has reached maximum resistance to the act of mixing, i.e. has a maximum capacity for absorbing mechanical energy or is in such condition that if it were being mixed (for development) in a laboratory, batch-type mixer, the instantaneous power required for driving the mixer would be at a maximum.

In general, the actual baking of the bread in the oven effects more or less of a rupture of the individual cells, i.e. so that the pressure of occluded gas is released and the finished load has a sponge-like structure with the voids at atmospheric pressure and arranged in a more or less continuous phase. These effects in the baked loaf occur as the heat converts the dough material from a state of plastic fluidity to a relatively solid state, e.g. as the starch swells and the dough stiffens. Hence the described relation of development to the cell wall structure is important for the desired cell retention in the dough mass or loaf thruoghout its processing up to the baking operation, as well as for optimum or otherwise controlled body structure and properties in the finished loaf. It will also be appreciated that although reference has been made to greatly under-developed and greatly over-developed dough, there is an infinite range of degrees of departure from so-called optimum development, i.e. ranging from completely undeveloped to tremendously over-developed conditions. Indeed a slight or moderate departure from the optimum or power peak stage of development is often useful, as in cases where some irregularity of cell structure in the ultimate loaf is desired. For such purpose, the present process affords ready and accurate control to any degree of development.

A particular important feature of the present invention, in its preferred practice, is the effect understood to occur in the second mixing or developing step whereby occluded free gas is finely subdivided and uniformly distributed in the dough. I have found that the character of grain or cell structure in the finished bread (including the attainment of a fine, uniform cell distribution) not only depends on the development of the dough material itself but is also determinable and in fact very accurately controllable by the extent to which the free gas in the dough is minutely and uniformly subdivided prior to the time when the dough experiences its final and significant expansion (as in final proofing). More specifically, it now appears that both the amount and the distribution of free gas in the dough are critical factors to be established not later than the completion of dough development, if best advantage is to be taken of the control of bread structure in the manner herein explained.

An intimated above, my research has tended to indicate that when mixing and like manipulation of the dough is essentially completed, all subsequent release of gas within the dough mass (e.g. during proofing) is directed only, or at least in very large measure, to the gas cells or bubbles which are already present. During proofing a very considerable amount of gas is freed from solution, having been previously there or being formed in solution as a result of continuing fermentation; such release of gas accounts for the expansion or rise of the loaf in the pan. Tests indicate that the carbon dioxide gas thus resulting from fermentation is not freed as a minute bubble or cell by the yeast organism, but is apparently formed in solution and comes out of solution only into the pre-existing cells. Thus after mixing is completed, it appears that essentially no new voids or spaces are formed, except (as in cases of under or over-development) in the sense that spaces may be joined by coalescence or breaking of cell walls. The relatively large quantity of gas released from solution seems to serve only to enlarge the existing cells rather than to create new ones intermediate the latter.

As stated, an extremely important function achieved in the developing step of the process described herein is the subdivision or fine dispersion of the free gas in the dough mass so that upon the conclusion of mixing it contains a multiplicity of extremely minute, indeed even microscopic gas cells very homogeneously distributed throughout the mass. They then constitute the cells which are enlarged during subsequent proofing; since they do not appear to increase in number, their number and distribution occurring at the end of the mixing step govern the cellular characteristics of the ultimate loaf. The smaller and more numerous the cells in the developed but unproofed dough, the smaller and more numerous the cells in the ultimate bread, except, of course, to the extent that departure from optimum development of the dough material permits large and irregular cells to be formed as explained above.

In the attainment of minute subdivision and uniform distribution of gas cells in the developed dough, I have also now found that the undissolved gas content of the dough is a significant factor, and indeed that is is usually important to reduce rather than to increase the free gas content of the preliminarily mixed dough as the latter enters the developing stage, this being a principle of operation heretofore unappreciated and indeed contrary to my own earlier concepts of the requirements of dough manufacture. That is to say, it now appears that if the amount of undissolved gas actually present in the dough during development is excessive, the mixing operation cannot properly accomplish a minute subdivision and uniform dispersion of the gas cells which will survive subsequent processing in the manner described above. Stated more generally, the nature of the ultimate cell structure is governed by the amount of free gas in the mixture as it is worked for development; in consequence an important feature of the present invention is the control of the undissolved gas content of the material in the developing chamber.

For many purposes, effective gas control is provided by the simple expedient of reducing the gas content of the pre-mixed dough to a minimum value, as explained hereinabove. It is found that under such circumstances (achieved automatically, so to speak, by the preferred type of premixing described herein) the residual free gas in the dough, together with the gas which may be liberated in appreciable quantity during the time that the dough is passing through the developer (even though such time is relatively short), ordinarily constitutes a workable volume of gas for subdivision into the extremely minute and extremely numerous cells. As expalined below, the free gas volume is also affected by the pressure in the developer; it is understood that with use of pressure the cells are compressed and more gas is driven or kept in solution, the corresponding lower gas volume being advantageous for many purposes.

In some cases, it may be desirable to add gas, e.g. air, to the dough mass in the developer while the latter is operating, for instance to achieve certain special results in the ultimate bread (such as an open or irregular grain structure attained without under-developing or over-developing the dough). While an effect similar to that of such addition of gas (i.e. air) could also be obtained by deliberately leaving more gas in, or adding gas to the preliminary mixture of dough ingredients, and while even in such case advantage is thus taken of the broad principle of gas content control, a more practical type of operation is to obtain as complete a reduction of gas content as is possible by the described, simple mixing step in the pre-mixer. Then if for any special reason more gas is needed in the dough, it may simply be introduced into the developer at a metered rate. As explained, the pre-mixing stage can, essentially automatically, yield a pre-mixed dough having a gas content which is not only low but constant and determinable; hence the simple metering of the added gas, to the dough traveling at uniform rate, provides an accurate control of the total gas content.

It has also been found that control of the action in the developing chamber of the present process, with respect to both dough development and subdivision of gas, may to a material extent be effected by regulation of the pressure in the development chamber. Indeed, somewhat contrary to previous understanding of dough-mixing principles, the maintenance of the dough mass under considerable (i.e. greater-than-atmospheric) pressure during the mixing for development is not detrimental, and may contribute materially to the attainment of improved results. More specifically, it has been found that the pressure under which the dough is maintained in the developing chamber, e.g. as measured near the outlet of the latter, can be correlated with rate and power of mixing action needed to develop the dough, and also with the attainment of a desired distribution of fine gas cells, the latter relation being derived from the effect of pressure on the amount of gas that may remain out of solution. For example, by the employment of relatively high pressure, say 20 to 30 pounds per square inch or so (numerical values herein being gauge pressures, i.e. above atmospheric), in the development stage and by carrying the specific development to the optimum or just beyond the optimum point, extremely fine grain (i.e. cell) structure is attained in the ultimate loaf. It appears quite evident that the actual free gas content of the dough, delivered in pre-mixed form with a low gas content as described above, is reduced still further by the pressure (i.e. in that the pressure reduces the total gas volume, presumably both by compressing the cells and by driving some of the gas into solution) to an optimum value for fine cell structure, viz. little enough to keep the cells very small, yet sufficient to have as many of them as will serve the purpose of nuclei for later expansion.

Although indications are that throughout a considerable range of pressures substantially the same total amount of work, i.e. energy, may be required to reach optimum development, other factors may vary. For instance, if the development time is kept constant, greater impeller speed and lower impeller shaft torque are required at low pressures, and lower speed and increased torque at higher pressures; or if the impeller speed is held constant, less impeller shaft torque but greater time to reach development are required at low pressures, and vice versa.

It is of considerable practical advantage in my process that within reasonable limits, an increase of pressure permits the attainment of development in a shorter time with a given speed of operation of the mixing elements. In fact by the employment of a closed mixer, where the dough may be developed under definite, positive pressure, and by the employment of a low free gas content in the dough, a much faster mixing to the point of true development is obtainable than can be achieved with the usual, commercial bakery equipment. Attempts to operate the conventional, non-pressure mixers of conventional bakery equipment at high speed usually are unsatisfactory, for the now apparent reason that excessive amounts of gas are occluded in the dough. The operation of large, batch-type mixers at high speed would also involve excessive power and impractical structural requirements. By reason of the continuous nature of my process and its capability of effecting development in a remarkably short time (e.g. of the order of a minute or two), it may be practiced with relatively small mixing units that are readily adapted to high speed drive.

It will now be seen that the procedure of the invention is capable of control in a number of convenient and precise ways, to achieve a great variety of conditions in the dough and ultimate bread. As already explained, with the rate of advance of dough at a constant value which may be selected for extraneous reasons of production speed, the attainment of development of optimum or any other character may be had by regulating the rate of working, i.e. the speed of the mixing elements in the developer. The free gas content of dough is another controllable factor, related chiefly to the cell size and distribution. The pressure in the developer may be adjusted (for example, by a throttling valve in the outlet) to affect both the extent of development reached and the cell size and distribution, these cell characteristics being presumably governed by the effect of pressure on the amount of free gas which may remain out of solution. For instance, assuming the dough to be pre-mixed to the preferred low gas content, the use of low pressures in the developer, say 2 to 10 pounds per square inch, will nevertheless permit a somewhat larger amount of undissolved gas to remain (than at higher pressures), and will thus produce a bread having the somewhat coarse or open grain that characterizes good commercial bread at the present time. That is to say, although such bread may have heretofore been regarded as of a reasonably fine texture, it is coarse in relation to the extremely fine-celled structure obtainable from doughs developed in the present process at the higher pressures (e.g. 20 to 30 pounds per square inch) mentioned above.

Instead of using lower pressure for manufacture of coarser-grained bread, it may sometimes be desirable to inject air into the developer and employ a higher pressure (20 pounds or so), or alternatively, with the higher pressure, to operate the developer at a lower rate of speed which represents a point of some under-development. It will be appreciated that the numerical values of pressure given above are chiefly given by way of example of the relation between different pressures, and represent values found useful under average conditions with fairly strong (i.e. hard-to-develop) flours. Thus in some cases, as with certain flours or with certain proportions or types of ingredients or other conditions of density in the premixed dough or of temperature, different pressures may be required, for instance in that relatively fine grained bread may sometimes be produced when the pressure in the developer is as low as 5 to 10 pounds per square inch, especially if the development is carried to the full optimum value or even slightly beyond it. Indeed useful bread, although usually of coarse texture, may be in some instances made with very little pressure in the developer, e.g. as low as one pound per square inch, or even no more than necessary to keep the dough advancing through the developer at a constant speed.

It will be understood that in the foregoing, the use of accepted, customary ingredients of dough mixtures has been assumed for their usual effects in dough manufacture, the only exception being that the present process is applicable to a so-called "no-time" dough made with a fermented brew or liquor (or to a dough, conceivably useful for some purposes, made directly with an unfermented source of leavening, e.g. an unfermented mixture of water and yeast) as well as to a dough for which a fermented sponge of conventional character and quantity is one of the ingredients supplied to the pre-mixer.

For example, oxidizing agents are now commonly employed for the improvement of bread doughs, the function of such agents or other improving agents of like ultimate effect being chiefly to yield a dough of superior cell strength and better baking qualities. Improving agents are not only useful but seem unusually significant in my process; indeed according to present evidence they appear, as a rule, to be critically important for best realization of the described advantageous results. Thus dough formulas used in the present process very preferably contain suitable quantities of one or more improving agents, of which a primarily important class consists of chlorites (e.g. sodium chlorite), iodates and bromates, which are all oxidizing agents. Most usually these are the potassium salts, although other soluble salts (e.g. sodium, ammonium, calcium and magnesium) may be used. Another useful group of improving agents, that do not appear to be true oxidants but are found to have similar ultimate effects in my process (perhaps by activating molecular or other oxygen present), includes reductic acid, which affords excellent results, and ascorbic acid, which is moderately effective. Generally speaking the substances useful in the process (whether of direct oxidizing or other character) may be described as improving agents adapted to enhance the gas cell retentivity of the dough upon development, i.e. upon mixing the dough to the desired state of development.

The amount of the improving agent and its character with respect to fast or slow activating (i.e. oxidizing or equivalent) effect are suitably selected in relation to the kind of development and grain structure sought. It is extremely desirable in most cases, however, to include some agent that will be promptly effective during the relatively very short period of travel of the dough through the developer. For example, excellent results have been obtained with a mixture of potassium iodate, which is quickly effective, and potassium bromate, that is slower but is desirably progressive or persistent during proofing and other subsequent processing. In the use of the sponge method in my process, a slower agent, such as bromate, may be effectively used alone, in that the fermentation of sponge which originally included bromate appears to activate the bromate for satisfactory results in the developing operation. Another improving agent is represented by the treatment of the flour with chlorine dioxide, for example in that flour so treated at a relatively high level has been found to afford effective results, and dough mixtures containing such flour may therefore be deemed to contain an improving agent. For no-time dough, made with brew or otherwise, very satisfactory results have been obtained: with flour that has previously been treated with chlorine dioxide (in amount substantially greater than that needed for the matured condition which customarily characterizes ordinary flour); or with ordinary flour, using iodate alone or reductic acid alone, as improving agent; or with formulas embodying mixtures of these materials with each other or with other agents. Mention may finally be made of other substances which are oxidizing agents and may be used but which seem definitely of less value as improving agents in my process, viz. persulfates (which have given reasonably effective results, for example, when added in considerable quantity at the sponge-making stage of the sponge process), such as ammonium persulfate, $(NH_4)_2S_2O_8$, and potassium persulfate, $K_2S_2O_8$.

As indicated above, the pre-mixing step preferably involves a simple operation whereby the dough ingredients are advanced and thoroughly combined in an open mixing vessel, to produce a dough of uniform composition, i.e. entirely wet and free from lumps, and to allow occluded or trapped gases to escape, e.g. gases present among the particles of dry flour. The agitation for pre-mixing is also preferably such (i.e. a simple stirring) that there is no appreciable folding or convolution or beating which would tend to entrap quantities or even small bubbles of air from the atmosphere. A particularly effective arrangement is to stir and advance the ingredients in a single linear direction, e.g. by elements moving at an angle to the path of travel, such as elements arranged helically, and revolving, about an axis along the path. At the same time, the mixing is esentially only of a preliminary sort and has no significant effect toward development; from the standpoint of the working necessary to be accomplished in the developer thereafter (i.e. to reach a state of development), the pre-mixed dough, whether made from sponge or not may be properly defined as undeveloped. While it is conceivable that some stage of partial development might be reached in an open mixer and that development might then usefully be completed in a closed mixer under high pressure, such type of operation would fail to realize many of the advantages herein described, including the features of simplicity of control that are afforded by the specific, preferred type of pre-mixing step set forth above.

When the completed dough has left the developer, further manipulation or undue pressure on it is preferably avoided. Any subsequent working, and especially any unusual pressure or strain, for example as might be occasioned by forcing the dough through long conduits or past obstacles under pressure, tends to damage or degrade the dough once it has been developed to the desired extent. The effect is apparently to break or injure the minute (and now growing) cells or voids, so that the finished bread may be found to have streaks or other areas of heavy and non-cellular structure, and may also have at least some irregular and large cells. In the presently preferred practice of the invention, however, any such further manipulation or pressure on the dough may be entirely obviated. For example, the stream of dough continuously extruded directly from the developer may simply be divided into segments of appropriate loaf size which are dropped into pans and transferred, first to the proofer and thence to the oven for baking, without any further mechanical treatment.

It may be noted that in the conventional procedures of dough manufacture, the damage or degradation caused in the dough by the divider and and rounder, particularly by the pressure in the divider, makes it necessary to subject the dough segments to the intermediate or overhead proofer for reestablishment of a free gas content, and then to a reworking by the stretching, folding and shaping operation in the so-called molder, for reestablishment of a distribution or subdivision of the gas cells. Only then, in the customary practice, are the dough pieces deposited in the pans and forwarded to the final proofer and the oven. The present process makes it possible in at least many cases to eliminate all of these devices, viz. the conventional divider, rounder, intermediate proofer and molder. On the other hand, the mixing system and method of the invention is perfectly operable to deliver developed dough for processing in conventional equipment of the type just mentioned, and where reasons exist for subjecting the dough to a standard divider and rounder, and other usual apparatus, basic advantages of the continuous dough mixing and developing operation may nevertheless be fully realized. Indeed in some instances, as where some manipulation or pressure on the delivered dough is unavoidable, a conventional molder may be usefully employed (on the separated dough pieces) to supplement the work of the continuous developer.

During the mixing operation in the closed developer of the invention, heat is generated. Indeed, the rise of temperature of the dough in the developer may often be taken as a measure of the extent of mixing, in that once the optimum development has been reached for a flour of given character and a dough of given composition the continuance of such results may be assured by maintaining the operation at a constant temperature rise. For example, by observing thermometer or other readings of the temperature of the dough at the inlet and outlet of the developer, the speed of mixing operation (or in some cases the pressure) may be manually or automatically adjusted as necessary from time to time in order to keep the temperature difference at a constant value. Since heat has a tendency to enlarge the gas cells both by natural expansion and by driving gas out of solution, the actual or absolute temperature possessed or reached by the dough in the developer is a further factor to be considered in determining proper operating conditions, especially if there is much departure from a normal temperature in the developer of say 75°–95° F. For instance, in warm weather or at very high mixing speeds, the gas content may rise beyond that which the dough has a capacity to contain in the desired form of fine cells. If so, the mixing chamber may be artifically cooled, as by circulation of suitable coolant around it, to maintain a lower temperature.

As explained above, the amount of free, i.e. undissolved gas that is contained or achieved in the dough in the developer is the critical factor for desired cell formation there, rather than the quantity of gas that remains in solution, although the latter may, of course, affect the time needed for subsequent proofing. In most cases, as also explained, best results in the developer are obtained by supplying it with pre-mixed dough having a low as well as constant content of free gas, for instance in the case of dough for white bread a gas content of the order of 4 to 6% by volume, corresponding to a dough density of 1.19 to 1.16. In the developer, heat and continuing fermentation both tend to increase the volume of free gas, while pressure tends to reduce it, e.g. by compressing the gas bubbles and by driving the gas, especially carbon dioxide, back into solution; indeed substantial pressure, as has been stated, is advantageous in the developer chamber to maintain the free gas content (i.e. volume) at a desired, usually low value in the dough about to be discharged from the chamber. Such pressure conditions may be achieved in any suitable manner, e.g. by the use of a closed developing chamber with cooperating means such as a pump having a positive propellant force to advance the dough into the chamber, together with appropriate restriction at the chamber outlet so that back pressure is maintained.

By way of example, it has been found that the greatest number of cells per unit volume of dough, and thus bread of the finest grain, will be produced, in the case of an average dough for making white bread (of bleached and matured wheat flour), when the undissolved gas content of the developed dough (i.e. the dough reaching the outlet orifice of the developer) is reduced to about 1% to 2% by volume. To obtain such low gas volumes, pressures of 10 to 40 pounds per square inch are usually needed, especially if there is no supplemental cooling. The range of useful pressure extends above these values, but as the pressure is raised a point is ultimately reached where ordinary types of dough are damaged in cell structure (with corresponding impairment of the bread, i.e. yielding bread of coarse grain), and at still higher pressures, the cell structure may be substantially lost. Indeed, above the point where some impairment of the cells occurs, the cell structure deteriorates quite rapidly with further increase of pressure. In apparatus of the character described below, for example, it was found that pressure damage was likely to occur in the neighborhood of 80 pounds per square inch.

On the other hand, the detrimental effect of excessively high pressure (e.g. pressures above those ordinarily providing a maximum number of cells) can usually be offset in substantial measure by injecting air or other gas into the mixing chamber to replace that which has been compressed and driven into solution, i.e. to insure that there is a useful volume of free gas in the mass. Such type of operation, for instance, can be of utility in achieving very high rates of production, i.e. extremely short development times, with a given apparatus. By this alternative type of operation, fine grained bread can be satisfactorily obtained. As will now be understood, the injection of excessive amounts of gas (under such circumstances) will also result in the grain becoming progressively coarser in character, i.e. by having too much rather than too little free gas to provide the maximum number of cells.

While in accordance with presently preferred practice and with an average type of bread dough mixture the gas content of the pre-mixed dough entering the developer is usually between 4% and 6% by volume, it will be understood that the precise value varies with different flours, different degrees of absorption (water content) and other variables such as the extent of oxidation or amount of oxidizing agents, and the amount of fermented materials employed. Whatever its value, however, the gas content of the pre-mixed dough can be kept substantially constant through a given run, and the developing operation is very readily adjustable (as in speed of mixing or in pressure, or if necessary by cooling or by injecting air) for accommodation to the gas content thus occurring in the pre-mixed dough.

As a further example of the wide range of conditions to which the present process is applicable, it has been explained that in some cases the closed mixing step can be performed with little or substantially no back pressure upon the dough mass within the developing chamber, i.e. beyond that necessary to keep the chamber filled while the dough continuously advances through it. Under such circumstances a bread having a rather open grain is ordinarily produced, proper development of the dough being obtained by selection of a suitable mixing speed, e.g. faster than under conditions of substantial pressure. Such bread will be similar to that commonly recognized as of home-made character.

As indicated above, a major advantage of the present improvements is the ready control or adjustment of the dough manufacturing operations to take account of differences among flours (e.g. in that so-called stronger flours require more work for development), or of different kinds of flour (white flours, other kinds of wheat flour, rye flour), or of dough mixes differing in various ways, or of different characteristics such as firmness and cell size in the finished bread. The major object upon which control is exerted is the second or developing step of the process, which serves simultaneously to develop the dough in the precise manner desired and to establish, in effect, the cell structure that the ultimate bread will have. The primary modes of control are by regulating the rate of working (i.e. the speed of the mixing elements) and by regulating the pressure in the developer chamber, supplemental control being possible by modifying the temperature of the dough (as with a cooling jacket), by the regulated injection of a gas, and by controlling the amount of pre-mixing. Although the rate of dough travel through the developer is a material factor (and can also be regulated to control the character of the dough), a special advantage is that such rate can be independently set to any of a wide variety of values (as may suit production requirements), while the mixing operation may in each case be accommodated to any of a wide variety of conditions and the production of a wide variety of types of bread, solely by regulation of other factors than the rate of dough travel.

The respective ways in which mixing speed, pressure and other variables (of the developer) are affected by conditions and affect the character of the dough and ultimate bread are described at length herein, with examples of representative situations. It will be appreciated that in the limited space of this specification quantitative directions cannot be set forth, nor even quantitative ranges of values, that will fit all possible variations of flour, dough types, production requirements, bread types and the like; for instance whereas one dough of a given flour and absorption will achieve full development and yield fine grain bread at a specific mixer speed and pressure of 15 p.s.i., another dough of stronger flour and greater absorption will require higher speeds and pressures for like results. It will also be appreciated, however, that data of this sort are very easily obtained in practice, i.e. to ascertain the proper operating conditions for any given situation.

That is to say, calibration of a given equipment for performance of the process throughout a variety of ranges of conditions, can be readily achieved in the light of the principles herein disclosed, for instance by correlation of a few simple test runs (using various doughs) with corresponding tests on development-curve instruments, and upon interpolation of such information by the use of standard development curves for still other doughs as needed. As another way of setting the conditions of the developer stage of the process for a specific dough mixture, samples of dough discharged at various adjustments ranging roughly from under-to and overdevelopment can be given successive but comparative tests (as by immediate transfer of each to a laboratory mixer) to determine their then resistance to mixing operation, i.e. the power required to drive mixing elements in each; if the developer is to operate at complete (but not over-) development, for example, conditions are adjusted so that the dough as discharged has substantially maximum resistance to mixing or is in a condition slightly beyond such maximum. Furthermore, since the process is so directly and predictably responsive to simple adjustment of various factors (especially mixer speed), judgment of results and effective guidance for adjustment of the apparatus to correct deficiencies can usually be obtained, by persons skilled in the art, from the appearance and feel of the extruding dough. As stated, very exact information can be had from laboratory mixing and baking tests such as are described above, i.e. tests not unlike those which heretofore have been routinely made in commercial bakeries. Indeed the practice of the process to attain any desired result is not only well within the sphere of ordinary skill as aided by flour and dough examinations of an ordinary sort, but is actually much easier than conventional doughmaking methods, in that the precise effects of the several control adjustments can be so readily understood or determined.

While as explained above, excellent bread dough can be made in the present process by delivering pre-established and fermented sponge to the pre-mixer along with additional flour and other ingredients, and while dough of some utility may alternatively be made by simply feeding flour, water, sugar, salt, an improving agent and yeast into the pre-mixer (in which event the small but definite gas content desired in the discharged dough may have to be obtained wholly from some residually occluded air or from air specially injected in the developer), a presently preferred type of operation involves the use of a fermented liquor or brew, as described and claimed in my copending application Serial No. 260,305, filed December 6, 1951, and now abandoned. For that purpose a fermented liquor is first prepared by making a suitable mixture of yeast in water containing sugar and other nutrient for the yeast organisms, such liquor being allowed to ferment for several hours. As thus prepared and used, the liquor embodies the products of the fermentation, and is also very preferably in a state of continuing fermentation, containing yeast which may continue to act as the dough is prepared and proofed. The dough mix, in the pre-mixer of the present invention, is then constituted of flour, with appropriate quantities of the fermented liquor and other ingredients such as sugar, salt, milk (e.g. as dried milk), shortening and improving agents.

It has been found that in this way, the inconvenient and cumbersome operation of first making a sponge and allowing the same to rise and ferment for periods of several hours, is entirely obviated, the only preliminary process being the much simpler one of preparing the fermented brew. At the same time, the ultimate bread has essentially the same desirable flavor and eating characteristics as bread made by the sponge process or by the older, straight dough process as earlier explained herein, all in desirable contrast to the specific type of "no-time" method mentioned above wherein no part of the ingredients is first fermented and the yeast is simply introduced as such, e.g. in appropriate water suspension, to the pre-mixer. That is to say, by my fermented liquor or "brew" process, satisfactory flavor is achieved, whereas in the direct process without sponge or other fermented content, a full, characteristic bread flavor cannot ordinarily be obtained.

It will now be appreciated that the brew process contributes effectively to the attainment of a rapid and continuous dough making operation of an extremely economical sort by the methods of the present invention, since there is no handling or storing of large batches of sponge and the only step of assembling dough ingredients is that which may occur continuously in the pre-mixer, requiring only the untreated dry ingredients, together with simple liquids such as the brew and the oxidant solution; yet the ultimate load of bread has the full flavor that has heretofore required several hours' fermentation of dough or sponge.

As above indicated, the process of the invention is directed to the manufacture of bread dough, as distinguished from batters and doughs wherein there is no problem of difficultly controllable development and wherein there is no requirement that a cell structure be established and controlled so as to survive through, and expand during, a considerable period, for example a proof time which is usually 30 minutes or more. Bread dough is distinguished by being yeast-leavened, i.e. containing yeast which by fermentation (that may at least in part have occurred prior to the complete mixing in my pre-mixer) produces carbon dioxide gas, the production or release of such gas continuing slowly over a prolonged time after the dough has been mixed and worked to the point of development, and the cell structure desired in the final product being reached in substantial measure during such proofing and before the dough is subjected to the heat of baking. Bread dough is also thus distinguished by tolerance of proof time, i.e. its property of retaining the yeast-generated $CO_2$ gas (in the form of suspended cells or bubbles) over the stated period of expansion or proof, such property not being required of batters or doughs that do not involve a slow but large release of gas and corresponding expansion, before baking.

Cake batters and the like are not only thin or highly fluid, but are leavened by chemical agents such as so-called baking powder (releasing $CO_2$ gas by reaction with a carbonate), or by beating, whipping or creaming so as to incorporate gas only by mechanical action. There is no proofing or like expansion period; the material is usually baked as soon after mixing as possible, unless the chemical gas-producing reaction is such that it does not occur until the heat of baking is present. Biscuit and cookie doughs leavened otherwise than with yeast, and pie and similar doughs that also lack yeast are plainly unlike bread dough; they and doughs made and processed for the manufacture of crisp or hard products (such as crackers and pretzels), even though the latter may employ yeast leavening, do not require the special control of dough development and cell formation necessary for the cell and cell wall structure peculiar to a relatively soft or resilient product such as bread.

Bread dough is necessarily made from flour (e.g. wheat or rye flours or both), water and yeast. Customarily it includes salt (sodium chloride) and is mixed to a plastic consistency (rather than a thin fluid) which cooperates with its developed structure, to retain the gas cells. It usually includes minor ingredients such as sugar, milk or milk solids, and shortening, for their contribution to flavor and texture, and one or more improving agents. Doughs of this general character may also include other things, e.g. eggs or egg values, raisins and the like; the term bread dough is used herein and in the claims, unless the contrary is specified, to include not only dough for making bread and other articles (e.g. ordinary rolls) of essentially identical formula, but also yeast doughs of somewhat different formula that have the same general requirements and characteristics described above for bread dough. For instance, doughs for sweet rolls and buns, coffee ring, and like sweet goods, made with more sugar, shortening and eggs than conventional bread formulas, come in the last-mentioned category.

By way of specific example and as further illustration of the performance of the improved procedure, the accompanying drawings show certain structures embodying various features and combinations of apparatus in accordance with the invention, for continuous production of bread dough.

Referring to the drawings:

Figs. 1A and 1B, taken together, show in perspective, and in a somewhat diagrammatic manner, one embodiment of the apparatus for continuous production of dough from continuously supplied ingredients, Fig. 1A representing structure extending upward from the upper part of Fig. 1B;

Fig. 2 is a longitudinal section, as if on the axis of one of the mixer shafts and one of the dough pump shafts, of the pre-mixer and dough pumping section of the apparatus of Fig. 1B;

Fig. 3 is a transverse vertical section on line 3—3 of Fig. 2;

Fig. 4 is a transverse vertical section of a developer device, such as shown in somewhat simplified form in Fig. 1B;

Fig. 5 is a horizontal section on line 5—5 of Fig. 4;

Fig. 6 is a transverse section, corresponding to Fig. 4, of a modified form of developer;

Fig. 7 is a horizontal section on line 7—7 of Fig. 6;

Fig. 8 is a horizontal section, corresponding to Figs. 5 and 7, of another modified form of developer;

Fig. 9 is a simplified wiring diagram for the apparatus of Figs. 1A and 1B; and

Fig. 10 is a schematic view of a modified system for controlling the ingredient feeders.

The general organization of the apparatus of Figs. 1A and 1B will be stated first. Into a main inlet hopper 20, dry ingredients are introduced from a plurality of continuously operating devices generally designated as follows, viz.: flour feeders 21 and 22, sugar feeder 23, salt feeder 24 and dry (powdered) milk feeder 25. These materials are delivered by the hopper 20 into one end of the pre-mixing and de-gassing unit 30, which at its other end discharges the pre-mixed dough to the dough pump 32. Other ingredients are also introduced to the pre-mixer unit, e.g. at its entering end, by the following, continuously operable, supply devices: the brew feeder 34, a device 35 for feeding pre-melted shortening, and a feeder 36 for delivering a solution of improving agent or agents. By the dough pump 32, the pre-mixed dough is advanced into and through the closed developer 40, which has mixing elements (described below) driven by a suitable source of power, for example, the variable speed motor 42. From the outlet orifice 44 of the developer, the dough is continuously extruded, for subsequent treatment, for example simply by depositing successive portions or segments in baking pans 46 that are carried past on a conveyor belt 48. All elements of the apparatus may be subject to remote control, for example by control or regulating instrumentalities mounting on a suitable panel 50 located near the developer discharge so that the operator has ready visual observation of the produced dough at all times.

Although other types of operation and control can be employed with the apparatus, description of the latter will be clarified by setting forth the example of one specific useful system. In operation of such system, the pump 32 is adjusted and maintained to deliver pre-mixed dough to the developer 40 at a desired rate (e.g. in volume per unit of time) which should ordinarily be coordinated with succeeding operations of the bakery, especially the loaves-per-hour capacity of the ovens. The pre-mixer 30 is accordingly adjusted to deliver dough at an essentially identical rate to the pump, it being understood that the nature of the pre-mixer may conveniently allow some leeway in its rate of operation, provided only that it keeps a full supply of pre-mixed dough at its outlet end, to keep the pump filled. Likewise all of the feeding devices 21 to 25 and 34 to 36 are adjusted in at least suitably approximate equivalence to the rate of dough advance by the pump 32, i.e. so as to maintain a constant proportionality among the various ingredients and to keep the pre-mixer essentially well supplied at all times.

While the feeding devices can be operated in exact correspondence with the pump, the apparatus preferably includes supplemental regulating means (described below) governed by the quantity of material actually carried in the pre-mixer 30, such supplemental means controlling the feeding devices in unison so that the pre-mixer is never excessively underloaded or overloaded in respect to its supply of premixed dough for the pump. At the same time, accurately adjusted and maintained feed rates for the separate feeding devices are very desirable, to maintain the necessary proportionality among ingredients, and sometimes to limit the range of regulation that is required of the supplemental means just mentioned.

The developer 40 has its mixing elements (described below) operated at an independently controllable speed by the motor 42, for the desired regulation of dough development and maintenance of a dough output of constant quality and characteristics, in a manner independent of the rate of dough advance. As explained above, change or regulation of the mixing operation can thus be achieved without affecting the production rate and over-all efficiency of the complete, continuous system.

It will be understood that any of a wide variety of devices may be employed for feeding the various solid and liquid ingredients, i.e. devices having electrical, mechanical, hydraulic or other driving or controlling instrumentalities, the chief requirement being that the device be adapted to feed the corresponding material at a controllable rate, or at least in desired proportion to other materials. Hence while in Figs. 1A and 1B the specific feeders shown are peculiarly appropriate for this organization of apparatus, they can be regarded, in a more general sense, as illustrative examples. For instance, the dry material feeders may be all like one of the illustrated types, or may be of various other and different types; and likewise the liquid material feeders. Similarly, the number of feeding devices may vary with requirements, or with the need of adaptability of the apparatus. Thus, the two flour feeders 21 and 22 permit two types of flour to be fed at once (for instance, winter and spring wheat flours, if such a blend is desired); or either can be used alone, the arrangement permitting rapid change from one type of flour to another. If greater flexibility is needed, more feeders can be used.

The flour feeding device 21 is a so-called scale feeder of known construction and comprises a receiving hopper 52 through which flour is introduced from a suitable supply (not shown) to a feed section 53 where the flour is deposited on a continuously driven endless belt 54, after passing a controllable valve or gate (not shown) which regulates the rate at which it falls upon the belt. The belt is driven at a constant speed by the motor 56, and at its central part forms part of or rests upon the platform of a scale or balance mechanism (not shown) such that the weight of flour on the belt can be counterbalanced by a scale beam 58 having an adjustable counterpoise 59. Through suitable further means (not shown), the scale beam is arranged to adjust and regulate the flour delivery valve or gate between the hopper 52 and the belt 54, to keep the advance of flour on the belt at a constant rate, by weight. Hence by adjusting the counterpoise 59, the rate of delivery of flour from the right-hand end of the belt 54 (toward which the upper web of the belt travels) may be set and maintained at any desired value. Flour thus continuously falls from the end of the belt 54, at a predetermined, selected, metered rate, through an opening 60 in the bottom of the feeder 21 and into the main hopper 20 through a dust-proof coupling 61 between the feeder and a dust-proof cover 63 for the hopper.

The other flour metering device 22 is an identical scale feeder, including a supply hopper 65, controlling scale beam 67 with an adjustable counterpoise 68, and a motor 70 for driving the feed belt (not shown), whereby flour at a predetermined rate (metered by weight) is delivered through the dust-proof coupling 72 and thereby through the cover 63 into the main hopper 20. For further particulars of suitable scale feeders such as shown at 21 and 22, reference is made to United States Patents Nos. 2,095,509, granted October 12, 1937, and 2,305,484, granted December 15, 1942, to Glenn G. Merchen.

The feeder 23 supplies another dry ingredient, e.g. sugar in appropriate divided form, at a desired rate in proportion to the flour and other ingredients. This device 23 (although it can, alternatively, be like the devices 21 and 22) is conveniently a screw-type feeder, for example embodying the improved, reciprocated-screw mechanism such as disclosed and claimed in the co-pending application of George M. Booth, Serial No. 685,278, filed July 20, 1946, now Patent No. 2,541,742, the mechanical details of such apparatus being omitted for brevity from the present disclosure. This feeder 23 receives sugar in its supply hopper 74, and delivers the material at a controlled rate through a dust-proof coupling 76 and a corresponding opening in the cover 63, into the main hopper 20. The feeder 23, driven by an electric motor 78 and a belt 79, has its delivery rate adjustable by the pulley ratio of the drive and also, most conveniently, by adjustment of the motor speed.

Identical screw feeders 24 and 25 are provided to supply salt (sodium chloride) and dry milk, i.e. powdered milk such as customarily used for bread dough, these devices having supply hoppers 80, 81 and discharging through couplings 82, 83 into the main hopper 20. Their feed screws (not shown) are likewise driven by variable-speed electric motors 84, 85, coupled by corresponding belts 86, 87.

For structural convenience, all of the feeding devices 21 to 25 inclusive, are mounted on a platform or floor 90 above the remainder of the apparatus in Fig. 1B. The latter view includes a lower part of the hopper 20, especially its outlet portion 92 from which the various dry materials are discharged by gravity into the pre-mixer 30. If desired (or unless the dry ingredients are separately sifted or screened) a sifter 94 may be employed above the outlet in the hopper 20, e.g. to provide a final cleaning or screening of the dry materials and also to inhibit caking or lumping. The sifter 94 can be of suitable, conventional type employing a mechanically vibrated screen (not shown) which should have a mesh sufficiently open to pass dry milk, sugar or other ingredients having relatively large particle size.

Along with the dry materials, the liquid ingredients are also delivered into the entering end of the horizontally elongated, upwardly open chamber 95 of the pre-mixer 30. Thus the device 34, adapted to feed fermented liquor when the system is used for the above-described brew process, includes a reservoir or tank 97 having a water jacket 98, through which suitably cold or hot water is circulated by inlet and outlet pipes 99, 100. The temperature of the contents of the tank 97 is thus brought to and maintained at a desired value and can be kept constant by a conventional thermostat 101 thermally responsive to the brew in the tank and controlling the flow of water as by a suitably responsive valve device 102 in the inlet line 99. Ordinarily the requirement of the circulation system is to cool the brew, which tends to heat up by reason of the fermentation reactions; hence cold water, either tap water or refrigerated if necessary, will usually be circulated through the jacket 98. In very cold weather, however, it may conceivably be necessary to warm the brew. In all cases the brew may advantageously be stirred continuously or as needed, e.g. by a motor-driven stirring device, not shown.

From the tank 97 the brew travels through a pipe 104 to a delivery pump 106 and thence through a pipe 107 to a discharge spray nozzle 108 comprising, for example, a length of pipe closed at its remote end and pierced along its side by a multiplicity of holes 110. The spray pipe 108 extends across the pre-mixer chamber 95 near the dry ingredient inlet 92, and is designed to eject brew uniformly across the entering mass of dry ingredients and thus to promote their rapid and effective impregnation with liquid.

Driven by an electric motor 112, which is variable in speed to adjust the rate of brew supply, the pump 106 is preferably a positive, accurate, metering device, for instance of the gear or like type, designed for easy disassembly and cleaning and thus for maintenance of fully sanitary conditions. When the device 34 is used to supply fermented liquor, the fact that the latter is saturated with carbon dioxide gas which would tend to be drawn out of solution upon the application of a negative pressure makes it desirable to locate the tank 97 in such position, e.g. well above the pump 106, as to maintain a positive head on the pump at all times. If the pump 106 is not itself tight enough (i.e. in its moving parts) to keep the pipe 107 full when it is not operating, a check valve (not shown) can be included between the pump and the line 107. That is to say, since a presently preferred mode of control involves interrupting the operation of the feeding devices from time to time as necessary to maintain a constant load in the pre-mixer 30, there should be no such delay in the reinitiation of brew feed as might result from the draining of any substantial part of the line 107 during the preceding period of non-operation of the pump.

The feeding device 35, which includes a receiving hopper or tank 115, supplies suitable shortening to the pre-mixer 30 in a liquid or pre-melted condition, presently preferred types being shortening such as lard or hydrogenated vegetable oil. Such shortenings are usually solid or semisolid at normal room temperatures. In the tank 115 the shortening is kept molten by thermostatically controlled heating means of otherwise conventional character, including the thermostat 116 controlling an electric heater 117. From the tank the melted shortening passes through a pipe 118, a pump 119 and a pipe 120 to a discharge nozzle 122 that opens into the inlet end of the chamber 95. If necessary, the pump 119 and the pipes 118 and 120 can be heated by electrical resistance heaters or hot water jacketing or the like (not shown) to keep the shortening from solidifying. The pump 119, operated by the motor 124, is similar to the pump 106 and adjustable for change in the rate of feed of shortening by varying the speed of the motor.

A generally similar feeding device 36 for the improving agent or agents comprises a tank 126 made of or lined with appropriately corrosion-resistant material (such as porcelain or glass) and adapted to contain a water solution, of predetermined strength, of the desired agent or agents. From the tank 126 the oxidant or other solution passes through a pipe 127, a pump 128, and a pipe 129 to the nozzle 130, opening into the inlet end of the chamber 95. The pump 128 may be similar to the pump 106 and is adjusted in rate of delivery of the improving agent material, by variation of the speed of its driving motor 132.

It will now be seen that with the various feeding devices, all of the necessary ingredients can be automatically and continuously delivered to the supply end of the pre-mixer unit, the delivery rates of the feeders being precisely adjusted in correct proportion to each other to satisfy the recipe or formula selected for the specific dough to be manufactured.

Referring now to the pre-mixing unit 30 (see Figs. 1B, 2 and 3), its chamber 95 comprises an open-topped, horizontally extending, U-shaped vessel having its sides and bottom constituted by a sheet metal section 135, made for example of stainless steel or other material easy to keep clean and sanitary, the bottom corners of the section 135 being rounded as indicated at 136, 137 for approximate conformity with the circumferential path of the mixing elements and the entire inner surface of the vessel being smooth and substantially streamlined to facilitate advance of the dough and to avoid crevices and pockets in which dough might be trapped. The inlet end (adjacent the hopper spout 92) and outlet end of the vessel 95 are respectively closed by the end plates 138 and 140. As shown, the bottom of the center section 135 is turned downwardly near the outlet end, and is there contoured to provide, conjointly with the downwardly extending end plate 140, an outlet spout 142.

Appropriate means are disposed in the vessel 95 for mixing and advancing the ingredients so that they progress from the inlet end and can discharge downwardly through the spout 142 as pre-mixed dough. While other types of mixing and advancing elements (involving more or less than two operating shafts) may be employed in some cases, a presently preferred arrangement comprises two blade-carrying shafts 143, 144, parallel to each other and extending lengthwise of the vessel 95 in a horizontal direction. The shafts traverse the end plates 138, 140 through sealing devices 146, 147 and are supported by bearings 148, 149 respectively carried on brackets 150, 151 outside the corresponding end plates. The seals 146, 147 (that may comprise simple plastic or rubber packing members) can be easily removed for inspection and cleaning without displacing the shafts from the bearings 148, 149 in which they are journalled; yet, at the same time, access of dough ingredients to the bearings is prevented.

At one end of the structure, e.g. ouside of the bearings 149 at the outlet end, gears 153, 154 are respectively keyed to the shafts 143, 144 and mesh with an idler gear 155 which is rotatably carried on a stub shaft 156 projecting from the plate 140. Although other arrangements for driving the shafts, including means turning them in opposite directions or in similar or opposite ways at different speeds, can be used, particularly satisfactory results have been obtained with the apparatus shown wherein the shafts are rotated in the same direction and at the same speed. It will likewise be understood that, if desired, the pre-mixer shafts can alternatively be driven from the opposite or inlet end, e.g. by means arranged at the left hand end of the pre-mixer as seen in Fig. 1B. In the arrangement here shown by way of example, the driving torque of a constant speed motor 160 is transmitted through a belt 162 and a gear reduction unit 163 (of conventional type, not shown in detail) that in turn has its output shaft 164 directly connected by a suitable coupling device 166, to drive one of the mixer shafts, e.g. the shaft 143, and likewise the shaft 144 through the idler 155. In the apparatus shown, the driving means, including the motor 160 and the speed-reducing unit 163, are mounted on a platform 168 which is supported by arms 169, 170 that constitute extensions of elongated frame members 171, 172 secured along the sides of the vessel 95 in supporting relation to the latter.

Each of the mixer shafts 143, 144 carries a multiplicity of projecting blades 173 spirally arranged, i.e. in a spacing which progresses both circumferentially and axially of the shaft from one end to the other so as to constitute each shaft assembly as a very open sort of screw. This screw configuration of the blades is such, relative to the direction of the rotation of the shafts, as to advance the ingredients or dough toward the outlet spout 142. The blades of the two shafts are also arranged so as not to interfere with each other although their paths of rotation may overlap very considerably, as seen in Fig. 3. Each blade 173 is preferably mounted with its plane tilted angularly about a radial axis (as seen in Fig. 2), i.e. in alignment with the pitch of the described screw arrangement, to aid in advancing the dough mixture. At the same time, the design and structure of the blades (for example, as shown) are particularly suited to their primary, mixing function, viz. the pre-mixing of the dough ingredients in the manner described elsewhere herein. While other types of dough-engaging elements alternatively or supplementarily carried by the shafts 143, 144, such as an edge-wise wound spiral ribbon spaced around the shaft especially in substitution for the blades 173 toward the inlet end, have afforded very good results, the illustrated structure is simple and effective.

To guide the pre-mixed dough into the outlet spout 142 and avoid discontinuities and air spaces in dough to the pump 32, a horizontal baffle plate 175 is mounted above the path of the blades 173 at the spout opening, as shown, the baffle having an upwardly flaring extension 176 to guide the mass of dough beneath it. The baffle 175 is preferably contoured for approximate conformity with the circumferential paths of the ends of the blades 173, and includes a V-shaped center section 177 conforming to the line of intersection of the blade paths. This baffle arrangement has been found highly effective in keeping the spout 142 filled with dough.

The vessel 95 also has a cover structure including an upstanding collar section 180 having an inward flange 181 at its top, supporting a removable cover plate 182. The cover nevertheless permits free communication between the interior of the vessel and the outside air, for example by having the plate 182 shorter than the opening bounded by the flange 181, to provide an aperture 183 located above the baffle 175 and thus not directly above the dough mass. Although if desired the opening 183 can be connected by a duct to, or otherwise provided with, means for preventing escape of flour dust while permitting relief of pressure in the vessel 95 (e.g. a dust-tight, gas-permeable, fabric breather cover, or a conventional dust collector—such devices being omitted from the drawing for simplicity), the arrangement is in any event preferably such that atmospheric pressure is maintained in the vessel at all times. Covered or not, the device 30 is thus essentially an open mixer, with the dough unconfined, i.e. in that gas trapped in the ingredients and released during the mixing operation, may escape freely, and there is no tendency to build up pressure in the vessel.

It will now be seen that the dry ingredients continuously introduced through the spout 92 are effectively wetted by the brew delivered through the multiple nozzle 108, and also receive the other fluid ingredients from the nozzles 122 and 130. The entire mass is propelled lengthwise of the vessel, i.e. toward the outlet 142, by the rotating elements 173, which simultaneously effectuate a thorough mixing of all ingredients. As a result, a uniform dough mixture, wherein all the flour is effectively wetted and all of the ingredients thoroughly combined, is delivered to the pump 32, yet without significant development of the dough. Preferably the ingredients and dough in the vessel 95 travel essentially linearly, i.e. (except for motion around the shafts) move predominantly in the same forward direction from the inlet to the outlet; and there is no beating or other action which might tend to entrap appreciable quantities of air. The arrangement of the vessel and mixing elements also tends to compact the traveling dough, when it approaches the end of the vessel, as a substantial mass in and above the outlet, assuming ample supply for the pump 32 at all times and maintaining the prime of the latter.

As explained above, an important effect of the pre-mixing is that a substantial amount of occluded gas (chiefly air) is released from the ingredients or mixture of them, principally in the first half of the vessel, and a pre-mixed dough of uniform, relatively high density is delivered through the spout 142. According to tests, the extent of mixing necessary to achieve full combination of the ingredients (yet without substantial development of the dough), is ordinarily sufficient to release all of the gas that is capable of being readily released by such an operation. Hence if the apparatus is designed and operated so that complete pre-mixing is achieved, for example, at least by the time that the dough mass comes under the baffle 175, all practical reduction in gas content is sure to have occurred by the time the mixture reaches that locality.

The apparatus preferably includes supplemental feed control means, e.g. relative to the actual amount of material in the vessel 95, to prevent an overload of dough which would back up in the pre-mixer and to prevent the pre-mixer from running short of dough for supply to the pump 32. Indeed experience has indicated that such control means may constitute a primary control for feed of ingredients, i.e. in that over a very wide range of rates of dough production, the arrangement described below is alone sufficient to regulate the ingredient supply, without adjusting the individual feeders except where a change of proportions is desired. One example of suitable means to that end is the following weight-responsive arrangement, shown in Figs. 1B and 3. The entire pre-mixer unit, as supported on the frame members 171, 172, is carried by trunnions 185, 186, which project laterally from the members 171, 172 on a common transverse axis and which are journaled in appropriate bearing brackets 187, 188 that are mounted on suitable angle members or the like 189, 190 constituting a part of the main stationary frame (not otherwise shown) for the entire apparatus. Thus the vessel 95 and associated parts, including in this instance a drive unit carried on the platform 168, may rock about the horizontal axis of the trunnions. At an appropriate locality spaced from the trunnions by at least a substantial part of the length of the vessel, and conveniently in part supported on a transverse platform or cross member 192 which extends between the remote, projecting ends of the frame elements 171, 172, means are provided for response to variations in contents of the vessel 95.

While other weight sensitive or like devices may be employed, the illustrated means advantageously includes a compression spring 194, extending between a stationary support 195 and the underside of the cross member 192, the spring 194 thus serving to support the outer end of the pre-mixer device, against its unbalanced weight relative to the trunnions, such unbalance in weight being conveniently represented in a substantial or at least readily detectable part by the weight of the contained dough ingredients and dough. To promote such effect, the trunnions are located near or at the discharge end of the device, i.e. so that most of the weight of the pre-mixer contents is between the trunnions and the platform 192. A convenient location for the trunnions is with their axis intersecting the center vertical axis of the discharge spout 142, as shown; or alternatively, they can lie beneath the coupling 166, which may then be sufficiently flexible to permit mounting the motor 160 and gear unit 162 on a separate, stationary support. The spring 194 may be adjustable in compression, as by the screw 196, for regulation of the control function now to be described.

The platform 192 also carries means cooperating with a stationary means to constitute a control instrumentality, i.e. so that at least one or the other of such means represents a signalling or transmitting device, to detect and translate changes of position (and thus changes in weight) of the vessel 95. For example, the platform 192 may carry an electrical switch device 197 having an operating arm 198 projecting laterally therefrom. From a fixed support 200, a switch actuating structure 201, including a detent element 202, adjustable in vertical position, is arranged so that the detent element lies in the path of the switch arm 198, for operation of the same in accordance with the position of the platform 192. The switch 197 may be of any suitable type, for example, a snap-action device of the character known as a "micro-switch," adapted for electrical circuit control in response to positional adjustment of its arm 198.

More specifically, for instance, the switch 197 is arranged to modify an electrical circuit when the weight of the vessel 95 decreases to a point that carries the arm 198 upward into engagement with the detent 202, such circuit modification effecting (by means described below) a reinitiation or acceleration of the feed of ingredients to the vessel 95. At a subsequent time, if and as the weight of the vessel increases to a point representing approach of over-supply of material therein, the platform 192 will have fallen correspondingly and will move the arm 198 down away from the detent 202, permitting the switch to resume its original position. A reverse circuit modification is thus effected, e.g. to arrest or retard the feed of dough ingredients. If desired, a dash pot 204, say of double-acting type, may be mounted between the cross member 192 and the stationary member 195, to damp any rapid fluctuations of the pre-mixer assembly, e.g. to damp such vibrations as may be caused by the impact of ingredients entering the vessel 95.

The dough received from the pre-mixer 30 is advanced by the pump 32 through the developer 40, preferably under pressure. Among various kinds of pumps that may be used, a preferred type is one which is adapted to displace dough positively and continuously at an accurately maintainable rate. A particularly advantageous pump is shown in Figs. 1B, 2 and 3, and includes a body structure 210 enclosing an oval pump cavity 211 which has the shape of two intersecting cylinders joined by tangent planes at the top and bottom. Parallel shafts 212, 213 disposed at the respective axes of the cylindrical surfaces carry intermeshing rotors 214, 215 in the cavity 211, preferably three lobed rotors (as shown) arranged to advance the dough positively along both semi-cylindrical surfaces, i.e. upon counter-rotation as indicated in Fig. 3. By means of meshing gears 216, 217, on the shafts 212, 213, the rotors 214, 215 are thus turned in opposite directions at the same speed, by a variable speed motor 218 driving the shaft 212. The bearings for the shafts are conveniently located wholly at one side of the cavity 211, e.g. as shown at 219 in Fig. 2, and if desired may be provided with removable shaft seals (not shown, but similar to those indicated at 146 for the premixer shafts), while the opposite side of the cavity is closed by a cover plate 220, held in place by bolts and removable wing nuts 222. Thus upon removal of the cover 220 the entire interior of the pump is fully accessible for cleaning.

Although other numbers of lobes or teeth may be employed for the pump rotors, or other types of pumps employed, the illustrated arrangement has been found very effective, particularly with lobes having suitably curved, interfitting surfaces such that they have very close clearances with each other and with the walls of the chamber. In this way, all surfaces are wiped substantially clean with each revolution and the dough displacement action is of a very positive character. As indicated, the described pump is adapted to meter the dough very accurately while delivering it against positive pressure, and is responsive to slight changes in rate, e.g. for optimum adjustment of the desired rate of production with the apparatus. In some cases other kinds of pumps may be used, for example gear pumps, pumps of the worm or screw type, or other types, it being understood that a pump involving substantial slippage is sometimes less advantageous.

The inlet of the pump at the top is connected to the spout 142 of the pre-mixer by a suitably flexible coupling 224, which may be a short bellows, or as shown, a relatively thick collar of rubber or other elastic material. Thus the necessary, rocking displacement of the pre-mixer on its trunnions is permitted, although as indicated above, the trunnions are preferably so disposed (i.e. centrally of the spout 142) that there is very little actual movement at this locality. From its lower opening 225 the pump 32 delivers dough into a conduit 227, for example in the shape of an elbow as shown, opening directly into the developer 40. A thermometer 228 and a pressure gauge 229 are mounted in the conduit 227, i.e. with their sensitive elements extending into or exposed to the passing dough, for corresponding indication of its pressure and temperature at all times.

The developer or main mixing device 40 is shown somewhat schematically in Fig. 1B, and in one form more specifically in Figs. 4 and 5, Fig. 1B omitting certain bearing structure and the like, for simplicity. This device comprises a body 230 enclosing an upright chamber 232 of horizontally oval configuration, e.g. as if defined by intersecting, upright cylinders joined by parallel, vertical, tangent planes at the sides. The chamber 232 is closed at the top by a cover plate 234 and at the bottom by an outlet plate 235 that has an appropriate funnel-shaped configuration at one side providing an outlet port or passage 237 that may open downwardly, or as shown laterally through a flanged mouth 239. An appropriate inlet port 240 is provided for the chamber, preferably at the top of one side of the body 230 opposite to the side below which the outlet port 237 extends. The inlet port 240 is connected directly to the conduit 227, for supply of dough as advanced by the pump 32.

On parallel, vertical axes, coaxial with the cylindrical surfaces of the chamber 232, the impeller or mixer elements 242, 243 are disposed. In the device shown in Figs. 4 and 5, each of the impellers has three solid, i.e. non-apertured blades, arranged to sweep past each other on counter-rotation of the elements, and likewise to sweep past the cylindrical surfaces of the chamber 232 with moderate clearance. The impellers 242, 243 are mounted on corresponding shafts 244, 245, which carry corresponding, identical, meshing gears 246, 247 (Fig. 1B) so that upon turning one of the shafts, the impellers are counter-rotated, say in the direction of the arrows in Fig. 5. Each shaft such as the shaft 244 (the structure for the shaft 245 being identical) traverses a removable seal 248 in the cover plate 234 and is journalled in suitable bearing structure 249 in an auxiliary cover and bearing housing 250. The impeller shafts are continuously turned by suitable drive instrumentalities such as the bevel gear 252 on the shaft 245 and meshing bevel pinion 254 on a horizontal shaft 255 (such gearing providing speed reduction, if desired), the shaft 255 being driven by a belt 257 from the motor 42. The motor 42 should have sufficient capacity for the power requirement of the contemplated dough mixing and developing, and the motor or its drive should be accurately adjustable in speed.

At an appropriate locality in or near the outlet of the mixer 40, for example in the exit tube or in the body 230 just above the tapered outlet passage 237, a pressure gauge 259 and thermometer 260 are mounted with their sensitive elements preferably extended or at least exposed in the chamber 232 or outlet, to indicate the pressure and temperature of the dough about to be delivered from the outlet 237. Through the cover 234 or at other appropriate locality in the upper part of the chamber 232 a small passage or conduit 262 extends, having a normally closed valve 263 which may be manually operated to vent the interior of the chamber 232 to the atmosphere, i.e. for escape of air when the chamber is being filled. Completion of filling of the chamber (and the elimination of trapped air) is indicated by flow of dough up through the vent passage 262. During operation, the valve 263 is closed.

From the outlet port 237 a short conduit 265 extends, including a manually adjustable valve 267, for example a valve of the butterfly type (having a circular valve disk with some clearance, pivoted on an axis diametrically of the pipe) which can be adjusted to vary the dough pressure during mixing in the developer 40. The outlet end of the passage 265 is provided with an orifice structure 268 having a gate member 269 arranged for adjustment to vary the size of the opening by displacement of the lead screw 270. As the stream of dough is extruded from the orifice 268 it may be severed by suitable means such as a pivoted knife 272, the latter being operated manually or automatically at rapidly recurring intervals, for example so as to deposit metered loaf-size quantities of completely mixed and developed dough in the pans 46, traveling past on the conveyor 48, the movement of which is synchronized with the operation of the knife 272. It will be understood that the conveyor 48 may appropriately extend or have connecting carrier arrangements, to transport the filled pans to or through further equipment (not shown) such as the final or main proofer and the baking oven. The adjustment of the orifice 268 by its gate 269 is useful to vary or regulate the transverse shape of the severed dough piece or section relative to its length.

Although the structure of the developer and particularly of its impellers 242, 243 may be varied considerably, as by the substitution of other types of blades or of alternative arrangements wherein the shafts are turned in the same direction (with provision for appropriate clearance), remarkably superior results have been obtained with a double impeller arrangement including counter-rotating blades that have very close clearance with each other, relatively larger clearance respecting the chamber wall, and an overlap of very considerable depth, i.e. in that the distance between shaft centers is only slightly greater than the radial extent of a single blade. By way of example of one type of structure wherein account was taken of factors now understood to promote efficiency: with solid-blade impellers having an outside radius, i.e. to the outer edge of the blades, of 5 to 5½ inches, present experience has indicated that excellent results can be obtained when the spacing of the blades of each impeller with respect to the structure of the other at localities of closest approach is of the order of ⅛ inch, and when the clearance from the semi-cylindrical walls of the chamber 232 is somewhat more, i.e. of the order of ¼ to ½ inch. Under such circumstances optimum development of dough has been achieved with only a short time of dough passage through the chamber, and with relatively low expenditure of power.

The developer 40 can be driven from either the bottom or the top, but the illustrated top drive affords least opportunity for dough to get into the bearings and also permits better space beneath the chamber for carriers, pans and other equipment that may be required in the division and removal of the finished dough. Horizontally or angularly disposed developer chambers (with impeller shafts in like position) are also useful in some cases; the vertical arrangement, however, is especially effective, and notably unsusceptible to the production of dough containing air or gas pockets.

Figs. 6 and 7 show an alternative developer structure wherein the mixing chamber 280, constituted by a body structure 281, is a single cylinder traversed by a unitary impeller device 282 mounted on vertical shaft structure 283, 284 so as to rotate about the axis of the cylinder, e.g. upon drive transmitted through the gear 285 on the upper shaft portion 283. The cover plate 287 includes an inlet port 288, tapered for streamlined flow into the head of the chamber, while the bottom plate 290 has a similar, tapered outlet port 291, the ports being preferably, though not necessarily, arranged at opposite sides of the central axis of the device. The bearings 292, 294 for the shaft portions 283, 284 respectively, are mounted outside the end plates 287, 290, which carry appropriate seals 296, 298 for the shaft sections. The body 281 has a surrounding cylindrical wall or supplemental housing 299 thus providing a jacket space 300 around the chamber, through which water or other liquid, of suitable temperature characteristics, may be circulated, as by means of inlet and outlet pipes 301 and 302.

While other numbers and arrangements of blades may be employed, the four blades 304 of the unitary impeller 282 are of a perforated character, arranged with substantial clearance from the inner cylindrical wall of the chamber 280, which carries, however, a plurality of vertical, axially extending ribs 306 having very close clearance with the vertical outer edges of the impeller blades 304. Preferably there are a different number of ribs 306 than of impeller blades 304, for example three ribs for an impeller with four blades. When the impeller is continuously rotated, the blade and rib arrangement causes the various portions of the dough mass to undergo complex motions, i.e. radially as well as circumferentially.

The device of Figs. 6 and 7 also has an air supply line which includes, in series, a tube or conduit 312, an air meter 314, conduit 315, a back pressure valve 316, and a conduit 317 opening into the top of the chamber 280 through the cover plate 287. By means of this sort air (or other gas) under pressure, supplied to the line 312 from a suitable source, may be introduced into the mixing chamber, as in situations where it is desired to increase the free gas content of the dough. It will be understood that the water jacketing and air supply instrumentalities of Fig. 6 may be incorporated, if desired, with the device of Figs. 4 and 5, or that of Fig. 8 described below.

As indicated, the mixing chamber may include any number of mixing elements or sets of mixing elements, an apparently important proviso being that the structure include dough engaging means which is moved relative to other dough engaging means, i.e. as exemplified by the blades 304 and ribs 306 in Fig. 7, or by the plurality of impellers 242, 243 in Fig. 5 (whether the latter are rotated in the same or opposite directions). As an instance of a further modification, Fig. 8 shows in horizontal section a structure which may otherwise be similar to the developer of Figs. 4 and 5, but includes a set of four impellers 320, 321, 322 and 323 carried on parallel shafts in a housing or body 325 and each having two solid blades, conveniently coplanar, as shown. The housing 325 is internally shaped as if constituted by four corresponding cylinders arranged in intersecting relation; the corners or projections 327 between the cylinders being here structurally embodied in the internal wall, as distinguished from the smooth, tangent surface provided in Fig. 5. While the two types of wall may be alternatively employed, the tangent wall at present appears preferable for counter-rotated impellers having a plurality of blades. Conveniently, the impellers 320—323 may be rotated (as by suitable gear means, not shown but similar to the gears in Figs. 1B and 4), e.g. in the direction of the arrows.

It will be understood that in various developer arrangements, such as here shown in Figs. 4 to 8, the impeller blades may be solid, or apertured as in Fig. 6; while very satisfactory results have been obtained with solid-blade impellers in operation of the developer of Figs. 4 and 5, apertured blades may also be used in the two-shaft or other plural shaft developers. A feature which appears to be of advantage in all of the specific developers shown, is that the direction of flow of dough through the developer, the impeller shafts, the impeller blades and their edges, and the developer walls are all parallel to each other. It is at present believed that the strain thus applied to the dough by the parallel, dough-engaging elements (of which some are moved relative to others) tends to produce planes or strained sheets in the dough and thereby to provide the foundation for bubble walls and surfaces; indeed it is now thought, in a more general sense, that efficient attainment of development involves an action which extensively and repeatedly stretches or strains various portions of the dough, e.g. so that all parts of the dough mass are thoroughly so treated.

At the outset of a given run with the equipment shown in Figs. 1A and 1B, a quantity of dough may necessarily be mixed and extruded through the orifice 44, without receiving full development and other characteristics achieved when operations are regularly under way in a continuous manner. For example, it has been found most expeditious to fill the mixer 40 with pre-mixed dough from the device 30, while the impellers 242, 243 are stationary. Hence a corresponding, considerable amount of dough is necessarily discharged from the orifice 44, which is not in condition for proofing and baking. Since this pre-mixed dough is nevertheless susceptible of development and use, means may be included, as generally indicated at 330, for feeding it back into the pre-mixer, after equilibrium has been established for the continuous run. The device 330 comprises a hopper 332, a dough pump 334 driven by a motor 336 (which may be of a constant speed type), and a discharge spout 337 leading from the pump into the vessel 95 at a locality near the inlet end of the latter. The pump may be similar, for example, to the pump 32.

Thus the unfinished dough preliminarily delivered from the orifice 44 may be collected and then fed into the hopper 332 so as to be mixed in with the further dough under preparation in the pre-mixer 30. For example, the speed of the motor 336 may be adjusted so that approximately 10% of the total mix (that ultimately reaches the pump 32) constitutes the material received from the device 330. Since the proportions of ingredients in the returned batch of dough are presumably the same as those delivered subsequently to the pre-mixer 30, it is unnecessary to maintain a precise ratio between the fresh ingredients (taken together) and the returned dough. At the same time, the weight-sensitive or other control of the mass of material traversing the vessel 95 suffices for control of the actual supply of dough available to the pump 32, the motor 336 being conveniently also under the weight-sensitive control just as the drives for the other ingredient feeders. After the preliminary batch of dough has been consumed by re-delivery to the pre-mixer 30, the apparatus continues to function simyply on the raw ingredients, without further use of the device 330 in a given run.

While the apparatus has been described for preparation of dough from wholly unmixed ingredients, including a brew from the tank 34, it may alternatively be employed with the so-called sponge process. To that end the equipment may include, for example as a permanent part of the installation for use at desired times, a sponge feeder 340, which comprises a hopper 342, a mixing, advancing and degassing vessel 344 and a sponge pump 346. The vessel 344 has a longitudinal shaft 347, carrying blades or other mixing and advancing means as indicated at 348, for example similar to either of the mixing shafts in the vessel 95. A variable speed electric motor 350 may serve, as shown, to drive the pump 346 (similar to the pumps 334 and 32) and the mixer shaft 347, for example by a belt drive 351 to the latter and a shaft 352 extending to the pump. Thus sponge introduced through the hopper 342 is advanced by the mixer 347—348, with release of any large bubbles or quantities of entrapped gas, and is positively discharged at a metered rate (by volume) by the pump 346 through the spout 354, opening into the vessel 95 at a locality near the inlet end of the latter. It will be understood that the variable speed motor 350 may be adjusted to operate in proper proportionality to the other ingredient feeders and can be controlled simultaneously with the driving elements of the latter, e.g. in response to the weight of the pre-mixer vessel 95. By virtue of the degassing action in the sponge feeder vessel 344, the sponge delivered to the pump 346 has a substantially constant density; in consequence its volumetric advance by the pump is essentially equivalent to a metering by weight so that the sponge is delivered in accurately controlled quantity.

Thus an accurately metered feed of prepared sponge is delivered to the vessel 95, for the described pre-mixing and gas-releasing action there with respect to the entire mass including further flour and other ingredients introduced by the other feeding devices, the pre-mixed dough being ultimately advanced through the developer 40 by the pump 32 as explained above. Ordinarily in the sponge process, further leavening or like agent is unnecessary, and the brew feeder 34 may be employed for corresponding feed of water, then usually needed in proper proportion for completion of the dough, the water being preferably maintained at a constant temperature by the means described above in the feeder device 34.

While various types of electrical or other control may be employed for the several feeding, mixing and dough-advancing instrumentalities, and while the specific controls for variable speed motors or the like may be of any suitable, accurate construction (e.g. preferably electronic controls as of the thyratron type) Fig. 9 shows schematically and in extremely simplified form, one embodiment of a suitable control system. Here the various motors for the feeding devices and for the drive of mixing and pumping instrumentalities are indicated by the same reference numbers as in Figs. 1A and 1B, and likewise the main control panel 50, with its adjustable devices. Merely for the sake of simplicity in illustration and explanation, the various motors are indicated as controlled in speed by simple, series rheostats or potentiometers, but it will be understood that more complex and accurate control devices of conventional type should actually be used, e.g. such as the Westinghouse "Mot-o-trol" systems, which nevertheless involve a main speed-controlling instrumentality, of the nature of a potentiometer, directly adjustable to change the speed of the controlled motor. For example, in the case of the drive motor 42, for the developer, the control is preferably such as to afford accurate adjustment of speed and to maintain constancy of the selected speed under varying conditions of load.

Fig. 9 also shows diagrammatically the inlet end of the pre-mixer chamber 95, arranged to swing about the horizontal axis of the trunnion 185 so that the operating arm 198 of the switch 197 moves in a path intercepted by the detent 202. Although as indicated above, a sensitive, snap-action switch may be employed, Fig. 9 shows, for simplicity, a pair of contacts at 197, adapted to be closed when the weight of the vessel 95 and its contents drops below a predetermined value and the platform 192 correspondingly swings upward, the contacts thereafter opening when and if the weight of the pre-mixer again exceeds the stated value. As shown, the contacts are connected in series with the winding 360 of a relay generally designated 362 (which may be of the adjustable time-delay type, e.g. having delayed response to deenergization, or be supplemented by other time-delay means, if necessary to prevent too rapid hunting in the control), the circuit of the winding extending to a suitable source of current at 363, so that when the contacts 197 are closed, the winding is energized, attracting its armature assembly 365 and closing the group of normally open contacts (that are controlled by the armature) as enumerated below. When the winding 360 is deenergized, the armature 365 is retracted (as by spring or other means, not shown), opening the relay contacts.

In the simplified form shown, the energizing and control circuits of the several motors 56, 70, 78, 84, 85, 336, 112, 124 and 132 all individually extend, from one side of each motor, through a correspondingly identified pair of contacts 56a, 70a, 78a and so forth in the relay 362, and thence in multiple via a common conductor 368 to one side of a main electric power line 370. The other sides or terminals of the motors 56, 70, which drive the flour feeders 21 and 22 (the latter being independently adjusted in rate by the scale counterpoises 59 and 68), are connected directly, through a common conductor 372, a main on-off switch 374 on the panel 50, a further conductor 375, to the other side of the power supply 370. The motors 78, 84, 85, 112, 124 and 132 (for the other ingredient feeders) have their other terminals respectively connected through the corresponding speed control devices 78b, 84b, 85b, 112b, and so forth, on the panel 50, to a main or common return conductor 376 and thence via the conductor 372, main control switch 374 and conductor 375 to the other side of the power line 370. Thus by adjustment of the several devices 78b, 84b and so forth, here shown for brevity as simple rheostats, the speed of the motors driving the several dry and liquid feeding instrumentalities 23, 24, 25, 34, 35, and 36 may be appropriately adjusted.

The motor 336, which drives the feeder 330 that returns the preliminary, uncompleted dough to the machine, has its other terminal connected through a conductor 378, normally open control switch 379, the lines 376 and 372, the main switch 374 and the line 375, to the other side of the power supply 370. While adjustable speed control may be provided, if desired, for the return dough feeder 330, high precision of feeding rate is not ordinarily required of this device and such control is therefore omitted from the present illustration.

The motor 218 of the main dough pump 32 is energized and controlled by a circuit which extends from one side of the motor through a conductor 380, an on-off control switch 381, a speed adjusting device 382 and conductors 383, 384 and 385, to one side of the power line 370. The other terminal of the motor 218 is connected through conductor 387 to the other side of the power line. Similarly one terminal of the motor 42, which drives the impellers of the developer 40, is connected through a conductor 389, a control switch 391, a speed adjusting device 392 and conductors 393, 384 and 385, to one side of the power supply, the other terminal of the motor being returned to the other side of the power lines via conductors 394 and 387. Although the speed adjusting means for the motors 218 and 42 are preferably of an accurate electronic or other suitable type (e.g. of known construction) the control devices 382, 392 are illustrated as simple rheostats, for the same reasons of brevity as explained in connection with the control devices 78b, 84b, etc. Conveniently the control devices 382, 392 and the switches 381, 391 are mounted on the panel 50.

The circuit for the motor 160 of the pre-mixer extends on one side through conductor 395, an on-off switch 396 on the panel 50 and conductors 397, 384 and 385 to one side of the power line 370, the other terminal of the motor 160 being returned to the other side of the power source via conductors 398 and 387. For visual indication of the fact of actual feeding operation of the several devices 21 to 25, 34 to 36, and 330, a signal, such as the incandescent lamp 400 is provided on the panel, the lamp 400 being connected in parallel with the relay winding 360. Being energized with the latter, and thus at times when the contacts of the relay are closed, the lamp 400 is illuminated only during the times when the motors 56, 70, 78 and so forth are energized and the corresponding feeders are operating. It will be understood that although not shown in Fig. 9, the sponge feeder 340 may have its motor 350 controlled in similar fashion to the motors 78, 84, and 85 of other feeding devices, i.e., by contacts under the weight-sensitive control of the pre-mixer and by suitable speed regulating means on the panel 50.

Although as explained above, the various electrical control and regulating instrumentalities have been illustrated as extremely simplified components, they clearly disclose by example, the essential principles and relationships of the system; while in actual practice there should be substituted the more complex and effective types of devices that are customarily used in the motor control art to perform functions of the sort respectively ascribed to the circuit elements here shown, such devices are in themselves entirely conventional and therefore need no illustration of their details of construction and connection.

The operation of the apparatus will now be readily understood. Assuming that the various feeders have been supplied with materials and that the rate control devices 78b to 132b (including the scale counterpoises 59 and 68) have been set to provide the desired feed rates (absolutely, and especially in relation to each other for the desired proportions of ingredients in the dough), the operator first sets the pre-mixer 30 running by pressing the switch 396. The main switch 374 is next actuated, initiating operation of all of the ingredient feeders simultaneously; since the vessel 95 is presumably empty at this time, the contacts 197 are closed, keeping the relay 362 energized and all of its feeder control contacts correspondingly closed. When the pre-mixer 30 has become fully loaded, the contacts 197 open, deenergizing the relay and interrupting operation of the feeders. At the same time, the indicator light 400, previously illuminated, is turned off, thus advising the operator that the pre-mixer is filled. He then closes the switch 381, starting the dough pump at a predetermined rate set by its control device 382. Dough is accordingly pumped into the developer 40, the outlet of the latter having been closed (as by the valve 267) for the time being, and the air vent valve 263 having been opened. While the developer 40 can be filled with its impellers 242, 243 completely at rest and while it is at present preferred that they be not in operation at full speed, running them at a slow rate has been found to facilitate the loading and to aid in the elimination of air pockets or voids via the vent 262. Accordingly the control device 392 for the motor 42 may be set at a very low or filling speed and the switch 391 actuated to run the impellers.

When the dough starts to extrude from the vent 262, the pressure control valve 267 in the developer outlet is opened to a desired setting, and the air vent valve 263 is closed. At the same time, the developer speed is increased to the desired, operating rate simply by adjusting the knob of the control device 392. Meanwhile, during the filling of the developer, withdrawal of dough from the pre-mixer tank 95 lightened the latter to the point of reclosing the contacts 197, thus again starting the feeding devices. As will now be appreciated, the feed of dough ingredients is thereafter continued, more or less intermittently, but in such fashion that the pre-mixer is kept sufficiently loaded at all times for properly continuous feed of dough by the pump 32. While conceivably the actual rates of operation of the several feeding devices can be exactly correlated with the speed of the pump 32 so that they run continuously, a convenient practice is to have the feeders operating at a slightly higher rate, so as to insure that the pre-mixer is always amply full, i.e. the feeder rates being slightly higher than the maximum contemplated to be required over a considerable range of dough production rates. Advantage is then taken of the regulating function of the control means including the switch 197 to turn off the feeders from time to time and prevent overloading. Thus the supply of ingredients is in effect controlled by the pre-mixer and in accordance with the actual demand of the dough pump 32, e.g. over a wide range of speeds of the latter.

It will be understood that the valve 267 is set to give the desired mixing pressure, i.e. as will be indicated by the gauge 259 when the developer is under way at its desired speed of full operation. The outlet orifice 268 is adjusted, for example by the gate 269, to afford the desired loaf shape.

As already explained, the dough extruded through the outlet orifice 268 during the first few minutes or so is usually insufficiently developed, and should be collected (as in a suitable vessel rather than in the pans 46) until the mixing and developing conditions have become stabilized. Such stabilization will be represented by uniform, desired development in the discharged stream of dough, for example as indicated by a levelling-off or constancy of the developer outlet pressure, which rises as the degree of development in the discharging dough increases. The dough extruded and collected up to such time can be fed back into the hopper 332 of the return dough feeder 330, which may be designed or set to advance it into the pre-mixer vessel 95 at some approximately selected rate, for example equal to 10% or so of the total operating capacity of the pump 32. The feeder 330 is started by its control switch 379, and can be similarly interrupted when all of the preliminary dough has been returned to the pre-mixer.

With the developer 40 in operation under stabilized conditions, the developed dough is continuously extruded through the outlet 268, at a rate determined solely by the speed of the pump 32. It may then be appropriately conveyed, e.g. in the shapes and sizes required for the ultimate bread, rolls or other articles, through subsequent necessary operations such as a proofing and baking. Although the dough can be extruded directly into the hopper of a conventional dough divider, a rapid and convenient process is to sever the discharging stream, e.g. by the knife 272, into suitably metered pieces, which then drop directly in the passing pans 46. The pans are transferred through the final (and only) proofing stage, for a proof of say 20 minutes to 75 minutes, and thence directly to the oven for baking. By precise setting of the speed of the motor 218 for the dough pump 32, the rate of dough production can be exactly correlated with the desired rate of plant operation, e.g. as determined by the capacity of the traveling-tray or other ovens used.

With the described apparatus in operation, the manufacture of dough is continuous and essentially automatic. Once regulated, adjustment of the principal controls that govern the development and cell structure of the product is seldom, and often never necessary during a given run, i.e. so long as the formula, and the quality and character of the flour and other ingredients remain the same. The principal regulation in these respects is achieved by changing the rate of working the dough in the developer 40, and thus specifically by adjusting the control device 392 to vary the speed of the impellers 242, 243. As explained above, control of development and cell characteristics is also possible by other regulation of the pressure in the developer, as by adjusting the valve 267, and supplemental regulation or control can be had for certain specific effects (as explained hereinabove), by the injection of air at a selected rate or by reducing or otherwise controllably modifying the temperature in the developer. Means for effecting both of these supplemental controls are illustrated in Fig. 6, e.g. the air supply 312—317 and the coolant jacket 300, equally applicable to other types of developing chamber. A further type of regulation feasible in some cases (but at present preferably omitted), is with respect to the length of time of length of path of the material in the pre-mixer; thus by displacing the ingredient delivery spouts and nozzles collectively, as a unit, more or less toward the outlet end of the pre-mixer, the operation of that device may be curtailed substantially uniformly to a selected degree, for example so as to leave a desired, higher content of free gas in the dough than when full pre-mixing is effected.

Should adjustment become necessary during operation, the attendant can easily change the setting of the valve 267, for example in the direction and extent needed to maintain a desirably constant pressure (as indicated by the output gauge 259) and a constant rise of temperature (i.e. constant temperature differential between the input and output of the developer) as indicated by the difference of the readings of the thermometers 260 and 228; or other adjustment can be made, as for example to change the indicated temperature rise back toward a predetermined value, by appropriately changing the speed of the developer motor 42. In general, the object of regulation (whether by original setting or later adjustment) is to maintain a desired, constant state of development and of cell subdivision in the extruded dough, e.g. as can be determined by visual observation of the dough and by feeling and handling it, and also by watching the temperature and pressure conditions of the developer. Further, observable properties in the dough are its density and more specifically, its free gas content, e.g. as may be determined by simple, appropriate tests on a sample of the developing or developed dough, withdrawn from the outlet 265 (ahead of the valve 267, i.e. before the dough reaches the valve) or from an appropriate sampling outlet (not shown) opening into the vessel 230. It will be understood that if the operation of the developer carries the dough appreciably beyond optimum or peak development, the pressure (e.g. at the gauge 259) may fall; hence, for example, if the indicated pressure falls off and if increase of developer speed (without other change) then tends to reduce the pressure further, overdevelopment is demonstrated, requiring appropriate adjustment as by reducing the speed of the impellers. On the other hand if tentative adjustment by increase of developer speed (i.e. impeller speed) tends to raise the pressure, underdevelopment is occurring and should be corrected by suitable change such as an increase of developer speed. Thus the state of dough development can be checked at any time by tentatively raising the developer speed and observing the result on the pressure.

The significance of the several detectable properties of the dough, including interpretation of the results of sample baking tests (in themselves, a perfect way of determining the effects of various factors), has been fully explained hereinabove, and likewise the relation of changes in working rate or extent, pressure (if any), undissolved gas content, and temperature to the properties of the finished dough and to the attainment of different kinds of results in the ultimate bread or kindred product. Accordingly by regulation of the impeller speed, pressure, and subsidiary conditions if necessary, any desired character of dough may be produced, for example at critically optimum development or at a selected character of over- or under-development, or any desired structure of the finished, extruded dough, with respect to the number, size and distribution of the minute bubbles or cells of free gas.

While it has been generally explained that the initial speed setting of the pump 32 can be correlated with the actual speed of subsequent bakery operations, a specific and in many cases extremely important factor may be the actual weight of the loaves of bread to be made. Thus, if desired, the speed of the pump, as well as the rate of action of the knife 272 or other dividing apparatus, may be initially pre-regulated to achieve accurate metering of the quantity of dough in each delivered piece, and thus of the ultimate weight of each loaf of bread. For full realization of my process it appears important that all of the flour (either as such or in part as sponge) and likewise most of the liquid such as brew or water should be subjected to the pre-mixing operation, which thus in all cases is properly defined as receiving dough ingredients and combining them into a pre-mixed dough; but it is sometimes possible although ordinarily less convenient, to introduce some ingredients (especially one or more of the materials which are used in only minor proportions) at a later point, for instance just ahead of or beyond the dough pump 32.

Although in some cases the developer 40 may itself include means for advancing the dough (in addition to or substitution for the pump 32; for example by providing the developer blades with a slight screw shape or pitch) and while it is at present greatly preferred that the dough advance be effected independently and with the function of the developer restricted to a relatively simple mixing or working type of operation (e.g. for optimum realization of controllability independent of the rate of dough delivery), it may be noted that in a preferred type of developer such as shown in Figs. 4 and 5 there is a pump-like action in the sense that a high pressure zone is produced on one side of the impellers and a lower pressure zone on the other side. According to present preference and indeed (according to tests) for optimum avoidance of gas pockets or other irregularities in the chamber, the developer is arranged so that the pre-mixed dough is introduced at the lower pressure side and the completed dough is withdrawn from the high pressure region. Such is the case in Figs. 4 and 5, with the impellers rotated in the direction of the arrows. While the pump-like action is thus in a direction to aid dough advance by the pump 32, it will be understood that its magnitude is minor relative to the action of the pump so that the latter fully governs the actual rate of dough advance throughout the working range of both pump speeds and developer speeds. Indeed the relations of the entire, preferred system are such that the dough cannot in fact traverse the developer and discharge from the outlet 265 at any rate differing from its metered advance by the pump.

Not only is it desirable to set the dough pump 32 at the outset for proper accord with the desired weight of loaves or other articles severed from the extruding stream of dough, but the process may advantageously include maintenance of uniformity of weight of dough pieces by continuing (e.g. periodic) regulation of the pump to that end. Although this step can be done automatically with a weight-sensitive pan conveyor to which a control for the pump drive is intermittently subordinated, manual performance is feasible, as by periodically removing and weighing one or more of the divided (or panned) dough pieces, and then manually adjusting the pump speed in the direction and extent necessary to correct any departure from uniform weight.

When the apparatus is used for manufacture of dough by the so-called sponge method, the operation is essentially the same. The previously prepared sponge is fed to the hopper 342 of the sponge feeder 340, which operates in the manner and effect described above to discharge sponge at a metered rate through the passage 354 into the pre-mixer vessel 95. As explained, the rate of operation of the sponge-feeding pump 346 may be adjusted to the desired value and its operation may be controlled in accordance with the weight of the pre-mixer 30 (by control of the motor 350 along with the motors 56, 70, 78, etc.) similarly to and conjointly with the other ingredient-feeding devices. The other dry and liquid ingredients may be essentially the same as previously described for the brew process, except that the amount of flour is in reduced proportion, and there is ordinarily no need to supply brew or other leavening agent in this final mixing, the feeder 34 being employed to supply water (as may be further required in the dough) at a controlled temperature and rate of feed. In all other respects, the operation of the pre-mixer 30, pump 32 and developer 40 are as already explained, the criteria and effects of control of the developer being likewise the same.

It will be understood that the sponge itself can be pre-mixed in batches, or continuously mixed using an ingredient feeding and pre-mixing system similar to that embodied in the illustrated apparatus. In either case, the preliminary sponge mixture is allowed to rest, in batches, for a considerable length of time, e.g. as in conventional practice, so that the desired fermentation occurs. Ordinarily this is a matter of several hours. The fermented sponge is then ready for use as described above in making the final dough mixture.

An alternative control arrangement for a plurality of feeding devices as embodied in the present apparatus, is shown in Fig. 10. Here the flour feeders are schematically indicated at 421, 422, the other dry ingredient feeders at 423, 424 and 425, and the corresponding brew, shortening and oxidant solution feeders at 434, 435 and 436, the feeding devices per se being of suitable type, for example essentially as illustrated in Figs. 1A and 1B. The arrangements for delivery of the materials by the feeders to the pre-mixer may also be the same, and are therefore omitted in Fig. 10. Instead of a separate motor drive for each unit a common drive system is employed, for instance operated by a master motor 440, turning a shaft 441 which through a master speed control unit 443 transmits power to a main drive shaft 445, the transmission unit 443 being of any suitable, known type, e.g. employing friction or other gearing and having means as indicated at 446 for accurate adjustment of the speed of the output shaft 445 through a considerable range.

The flour feeders 421, 422 are each appropriately coupled to the shaft 445 by gearing 448 and 449, which may provide suitable reduction if necessary. The remaining feeding devices 423 to 425 and 434 to 436 are similarly actuated, each by gearing 450 coupled to the main shaft 445 and extending to the feeding device through a variable-speed transmission unit 452. In this way all the feeding means are mechanically driven by a single source of power but are individually adjustable in speed, the flour feeders 421, 422 by the adjustable scale counterpoises 459, 468 (as in the case of Fig. 1A) and each of the other feeders by its variable speed gear box or the like 452. While control of the main drive motor 440 for the entire apparatus may be effected from a relay such as the relay 362 in Fig. 9, and thus in the same manner as the several feeder-driving motors there shown, an alternative arrangement (equally applicable to the system of Fig. 9) is shown, as follows.

The weight-sensitive platform 192 of the pre-mixer 30 is arranged to actuate one element 470 of a telemetering or controlling system, for example an electrical position-responsive system generally designated 472, so as to position the element 446 of the speed control unit 443 in proper accordance with the state of loading of the pre-mixer vessel 95. While it will be understood that any of various electrical, mechanical or fluid-operated control devices may be employed, Fig. 10 shows, for brevity of illustration, a simple electrical bridge having resistors 473 and 474 with their outer terminals connected in parallel. The element 470, positionally adjusted by the vessel 95, is a movable tap on the resistor 473, the resistor 474 having a like tap 475. Thus a motor 476 connected between the taps 470 and 475 will receive no energization from the supply line 478 (connected to the outer terminals of the resistors) so long as the bridge is balanced. Upon unbalance of the bridge by displacement of the element 470, the motor is energized, the arrangement being such that it then so operates as to displace the contact 475 (by mechanical connection indicated at 480) to a new position of balance, and also (by further mechanical connection 482) to shift the speed control element 446 to a new setting. The directional response is such that upon increase in weight of the vessel 95, the element 446 is adjusted to a setting of slower speed, and vice versa, so that the state of flow of ingredients to the pre-mixer is automatically regulated to maintain a substantially constant load in the latter device.

By way of illustration of my procedure for making bread dough (especially when performed in the presently preferred manner described above in direct reference to Figs. 1A and 1B), the following are specific examples of proportions and operations found useful in certain particular cases. It will be understood that the nature and amounts of ingredients may vary widely in accordance with principles and requirements known in the baking art, and that the conditions, circumstances and values of various factors (such as speeds, pressures, temperatures, gas content and the like) may differ to a wide extent, in due accordance with the principles and the criteria of control which are explained herein.

In each of the described examples, the apparatus employed was of the type shown in Figs. 1A and 1B, including the pre-mixer 30, the pump 32 and the developer 40, the pre-mixer receiving ingredients as shown and the pump receiving the pre-mixed dough at the pre-mixer outlet and advancing the dough directly through the developer. By way of example of dimensions and other values: the pre-mixer vessel 95 had a length of 42 inches, a width of 13 inches and a total capacity of about 3.5 cubic feet. The dough enclosing region of the developer 40 had a height of 16 inches, maximum horizontal dimensions of 17½ inches and 11½ inches, and a total capacity of 1½ cubic feet, the impellers 242, 243 having a horizontal clearance from the outer wall of about ½ inch and a minimum mutual clearance of about ⅛ inch. The pump 32 was adjustable to deliver pre-mixed dough at rates from 0.7 to 1.5 cubic feet per minute, and was usually operated at about 1.0 cu. ft. per minute, without change during a given run. The conduits 227 and 265 had a cross-section area of about 7.5 square inches. It was found that the conduit 265 (assuming a relatively short passage 237 of a few inches, forming the exit port of the developer) should preferably be no longer than about 12 inches; when the developed dough was forced through conduits longer than 12 inches or so, it was apt to be damaged to the extent of compacted streaks or other imperfect regions in the baked bread. While these effects could usually be corrected by supplemental working, as by passing the severed dough pieces through a conventional molder, it is preferable to avoid additional steps or equipment. If a somewhat longer discharge conduit should be required, damage to the dough may be avoided by using conduit of larger inside dimensions (i.e. cross section area); the safe length of the exit duct is thus considerably governed by its transverse dimensions, e.g. in that the volume of dough touching the conduit wall should be small relative to the total volume in the conduit.

In each of the following Examples I to V, my brew process was employed, i.e. by first making a fermented liquor, which was then supplied to the pre-mixer by a feeder such as shown at 34.

*Example I*

A brew was made by first mixing the following ingredients:

| | Lbs. |
|---|---|
| Water | 63 |
| Compressed yeast | 3.5 |
| Sugar | 4 |
| Yeast foods | 0.5 |
| Non-diastatic malt | 0.5 |
| Wheat malt | 0.25 |

This mixture was kept in a suitable vessel, and thus allowed to ferment, for 4 to 5 hours, the temperature being controlled to remain at about 80° F.

In making dough with the quantity (about 72 lbs.) of brew prepared as just described, the following dry ingredients were used:

| | Lbs. |
|---|---|
| Flour (white) | 100 |
| Salt | 2 |
| Sugar | 3 |

In addition 2 lbs. of shortening, e.g. a vegetable shortening, were used, and oxidizing agents, measured as parts per million (by weight) of flour, e.g. 10 p.p.m. of potassium iodate and 25 p.p.m. of potassium bromate. The improving agent material was introduced as a single solution in water, made up with approximately 0.350 gram of $KIO_3$ and 0.875 gram of $KBrO_3$ per liter of water.

The various ingredients, viz. brew, dry ingredients, shortening and improving agents, were continuously fed to the pre-mixer in the proportions indicated, and the procedure carried out as described hereinabove. It was found that a very satisfactory dough was continuously extruded from the developer (after equilibrium had been reached), which upon proofing (for about 60 minutes at 90° F. and a relative humidity of 95%), was baked, to yield white bread of superior quality. This bread, low in shortening and lacking milk, was of a so-called lean character.

*Example II*

A dough suitable for white bread of relatively rich nature was made by using a brew of identical character and amount with that of Example I, improving agents of the same kind and quantity, and other ingredients as follows:

| | Lbs. |
|---|---|
| Flour (white) | 100 |
| Salt | 2 |
| Sugar | 5 |
| Dried skim-milk solids | 5 |
| Shortening | 4 |

The procedure was otherwise the same, and likewise the subsequent proofing and baking of the dough pieces divided from the extruded, developed dough. A rich, white bread of fine quality was produced, having a flavor equal to or better than average grades of bread made by conventional sponge or straight fermented dough methods. It may here be noted that in these and other instances of the practice of my process, as with the described apparatus, the loaf volume per unit weight of bead baked from the resulting dough, was found to be just as great as, or greater than, that which is realized in present commercial baking operation using conventional procedure.

In each of these examples, the rate of operation of the developer 40 was regulated to provide optimum development, or nearly optimum development in the extruded dough. Such result was found to occur, in each instance, in accompaniment to a temperature rise of approximately 10° F.; whereas the dough entering the developer had a temperature (at the thermometer 228) of about 78° to 82° F., the dough at the outlet thermometer 260 had a temperature of about 88° to 92° F. In each case, the time of passage of any given quantity of dough through the developer was approximately 85 seconds, and the developer impellers each turned at a speed of approximately 115 r.p.m. The outlet pressure was maintained in a range of 1 to 40 pounds per square inch, i.e. by adjustment of the valve 267. With successive runs of each of these formulae, or with successive parts of the same run using different batches of flour, it was found desirable to adjust the developer speed within a range of 50 to 150 r.p.m. (per impeller) in order to obtain the optimum conditions of development. Stronger grades or types of flour required operation at higher speeds in this range, and vice versa.

The specific operations described yielded bread of intermediate moisture content and of soft or moderately soft texture. To make a bread of more moist character, the liquid content needs simply to be increased, for example by increasing the water to a proportion of say 68 pounds per 100 pounds of flour. Such increase of water may be accomplished in the brew, or by separate introduction. It will be understood that the oxidant solution is fed at a small rate, e.g. as a fine stream from the nozzle 130, so that it does not constitute a significant fraction of the water content. On the other hand, to produce a white bread of firm character, the water content may be reduced, e.g. to 60 pounds per 100 pounds of flour. At the same time, the developer speed may be adjusted to yield a slightly under-developed dough, which results in a thicker cell wall in the bread and therefore a firmer crumb. Optimum developed dough usually produces a thin cell wall and a soft bread crumb.

In the described operation of the above Examples I and II, at developer outlet pressures of 5 to 20 p.s.i. and developer impeller speeds of 75 to 115 r.p.m., a bread of moderately fine grain was produced. To achieve a white bread of extremely fine grain, i.e. having a structure of multitudinous, minute air cells and a correspondingly soft and smooth texture (far beyond any such characteristics commonly achieved in commercial bread), the developer should be operated so that the outlet pressure, i.e. at the gauge 259, is 20 to 40 pounds per square inch. In addition, the development can be carried to optimum or slightly past optimum extent, e.g. by operating the impellers at or near the highest speed of the range specifically mentioned above, or indeed at still higher speeds. Bread having the moderate size of grain of the usual commercial bread, is usually obtainable (in the present process) at pressures of 5 to 15 pounds per square inch, the valve 267 being adjusted to a correspondingly wider opening. For still coarser grained types of product, the valve can be further opened to maintain a relatively low pressure, say 5 pounds or less, at the gauge 259, and other conditions regulated as necessary. While the numerical values of pressures and impeller speeds given above have yielded the stated results in the described apparatus and with certain good commercial flours, it will be understood that in all cases the conditions will depend on the properties, e.g. as to development, of the particular flour used.

The effect of an open grain or large cell structure in the ultimate bread is enhanced by some under-development of the dough, e.g. by reducing the developer speed so that the extruded mass is appreciably under-developed. In addition, if desired, air may be injected into the developer, as by means such as shown in Fig. 6; while coarse grained bread is usually attainable without this expedient, it may be useful in some cases, for example if an open grain or cell structure is desired while retaining a cell wall of extremely thin and soft character.

Other types of bread may be readily produced, including specialties such as raisin bread or the like, achieved by feeding proper quantities of raisins into the pre-mixer 30. The following are specific examples of whole wheat, rye and wheat breads, each again made with the use of fermented liquor and each involving operation of the pre-mixing and developing process of the present invention in essentially the manner described above and with essentially the same characteristics of control. While the brew may be the same as in Example I hereinabove, some differences of composition are noted in the following examples, not only to afford different flour absorptions (i.e. differences of water content) but also to indicate other ways in which the brew may be changed, including variations (as in the case of rye bread) designed to afford special characteristics of flavor or the like. It may be noted in passing that the water content needed in a dough is chiefly determined by the flour, and is commonly measured as a percentage (e.g. 60% absorption), meaning the number of pounds of water required per 100 pounds of flour to produce a dough of normal consistency, suitable for bread-making.

For brevity, each of Examples III, IV and V simply lists the ingredients used, it being understood that the procedure of making the brew, and the operations in mixing and developing the dough are essentially the same as for Examples I and II. It may be noted that the brew fermentation time may vary considerably; for example, a time in the range of 3 to 5 hours is recommended for each of the brew compositions described in Examples III and IV, and 4 to 5 hours in Example V. In each of Examples III, IV and V, the improving action (e.g. oxidation) in the dough was effectuated by supplying iodate and bromate solution (i.e. a single solution) to the pre-mixer at a rate sufficient to introduce 15 p.p.m. potassium iodate and 35 p.p.m. potassium bromate.

*Example III*

Dough for whole wheat bread:

| Brew ingredients— | Lbs. |
|---|---|
| Water (more or less) | 60 |
| Yeast | 3.5 |
| Sugar | 4 |
| Non-diastatic malt | 0.5 |
| Yeast foods | 0.25 |
| Malt flour | 0.25 |
| Other dough ingredients— | |
| Whole wheat flour | 100 |
| Sugar | 3 |
| Salt | 2 |
| Shortening | 3 |

*Example IV*

Dough for rye bread:

| Brew ingredients— | Lbs. |
|---|---|
| Water | 60 |
| Yeast | 3.5 |
| Sugar | 4 |
| Non-diastatic malt | 0.5 |
| Yeast foods | 0.25 |
| Malt flour | 0.25 |
| Sour culture (optional) | 2–5 |
| Other dough ingredients— | |
| Rye flour | 50 |
| Wheat flour (clear) | 50 |
| Sugar | 2 |
| Salt | 2 |

*Example V*

Dough for wheat bread:

| Brew ingredients— | Lbs. |
|---|---|
| Water | 62 |
| Compressed yeast | 3.5 |
| Sugar | 4 |
| Non-diastatic malt | 0.5 |
| Wheat malt | 0.25 |
| Yeast foods | 0.5 |
| Other dough ingredients— | |
| Whole wheat flour | 50 |
| Wheat flour (clear) (more or less) | 50 |
| Sugar | 3 |
| Salt | 2 |
| Shortening | 3 |

In cases where the sponge process is used, corresponding changes of ingredients should be made, as will now be readily understood by those skilled in the baking art. For instance, a sponge may be prepared in accordance with customary practice, including yeast (and yeast food, if desired), water, oxidizing agent (usually bromate) and say 60% of the total flour to be employed in the completed dough, the sponge mixture being allowed to ferment for 3 to 5½ hours. Thereupon the sponge is fed into the pre-mixer by a device such as indicated at 340 in Fig. 1B, along with the remaining ingredients, including further flour (e.g. the remaining 40%, water, sugar, salt, milk solids, shortening (if desired), and preferably some more improving agent such as iodate. In other respects, the operation of the process is essentially the same, subject to the same types of regulation (but with necessary changes in value—e.g. to lower developer speed) for control of the characteristics of the dough.

It will now be seen that the present process and apparatus afford a highly advantageous and expedited operation for the manufacture of bread dough, especially in a continuous manner and yet with the steps so regulated and controlled as to produce any of a great variety of breads and bread-type products, each extremely uniform and each equal or indeed more often superior to the best of present, commercially manufactured goods.

It is to be understood that the invention is not limited to the specific methods and apparatus herein described, but may be carried out in other ways without departure from its spirit.

This application is a continuation of my copending application Serial No. 177,418, filed August 3, 1950, for Manufacture of Dough and Baked Products, and is therefore constituted, and intended to be considered, as if filed on said date, the pendency of said application Serial No. 177,418 having now been terminated in favor of this continuation thereof.

I claim:

1. A method of making bread dough, comprising continuously pre-mixing and advancing into a confined region, a dough mixture comprising flour, water, active yeast, salt and an improving agent, said water and yeast being supplied as a fermented, active yeast-containing liquor, said pre-mixing operation comprising supplying dough ingredients including at least the flour and said liquor to a pre-mixing zone in predetermined proportions and mixing said supplied ingredients to combine them thoroughly into pre-mixed dough lacking effective development, and said advancing operation including continuously advancing the aforesaid dough mixture comprising said pre-mixed dough, substantially immediately as it is formed, at a selected rate through said confined region, said liquor constituting substantially the entire water content of said dough mixture, working said dough mixture while it traverses said confined region, at working rates adjustable independently of the preselected advancing rate, to provide an amount of working of the dough to convert it into developed bread dough, and continuously discharging the dough from said region as it is advanced therethrough, said working step consisting in physically working the advancing dough in said region to a sufficient extent to impart to the discharged dough substantially greater gas-cell-retention properties than in the pre-mixed dough and thereby to establish a constant and effective development in the discharged dough.

2. In bread dough making apparatus, in combination, a pre-mixing vessel having free communication to the atmosphere, a closed dough-developing vessel adapted to be filled with dough under pressure and having an outlet for extrusion of dough, pumping means intermediate said vessels for advancing dough from the first vessel and into the second vessel under pressure sufficient to force the dough to extrude from the outlet of the latter, and dough-developing mixing means in said second vessel having driving means therefor adjustable in speed independently of the pumping means, said dough-developing means being mixing means for working the dough sufficiently to develop it as it is advanced by the pumping means, said pumping means comprising an inlet passage and structure engaging successive quantities of dough received in said inlet passage and propelling said quantities into and through the second vessel, said first vessel communicating with said inlet passage and having dough mixing and advancing means, and said first vessel and said advancing means thereof being arranged to deliver dough continuously into said inlet passage under sufficient head to carry said dough directly and freely to said dough-engaging structure.

3. In bread dough making apparatus, in combination, a pre-mixing vessel having free communication to the atmosphere, a closed dough-developing vessel adapted to be filled with dough under pressure and having an inlet and an outlet at opposite end regions thereof, dough-propelling means connected between said first vessel and the inlet of said second vessel and receiving dough from the first vessel, for continuously advancing dough into the inlet of the second vessel, to drive said dough through the latter and out of its outlet as a substantially continuous flow of dough, and dough-mixing means in said second vessel and including members moved relative to each other in a direction transverse of the direction of travel of dough from inlet to outlet, for working the dough sufficiently to develop it as it traverses the second vessel, said dough-mixing means having driving means therefor adjustable in speed independently of the dough-propelling means.

4. Dough making apparatus as described in claim 3, wherein the aforesaid members in the second vessel comprise at least two members projecting into the dough through regions extending along the dough path from inlet to outlet, and wherein the dough-mixing means also includes means for cyclically moving one of said members relative to the other for working the dough, one of said members constituting a projecting rib at the inner face of the second vessel and another of said members constituting a mixing blade, said moving means comprising rotatable shaft means for driving said blade in a path of revolution repeatedly passing the rib.

5. Dough making apparatus as described in claim 3, wherein the aforesaid members comprise at least two members each constituting an impeller blade, said blades co-extending along the dough path from inlet to outlet, and wherein the dough-mixing means also includes a pair of shaft means respectively carrying said blades, and means for rotating the shaft means to turn the blades through intersecting paths of revolution.

6. In bread dough making apparatus, in combination a closed vessel having an inlet and an outlet mutually spaced to provide a path for dough through the vessel, mixing means in the vessel for working the dough which traverses said path, to effect substantially maximum development thereof, volumetric dough-propelling means connected to said inlet for continuously advancing dough material into said vessel under pressure and for thereby advancing dough continuously through the vessel and out of the outlet as a substantially continuous flow of dough, said outlet including passage structure for dough having an adjustable orifice for maintaining an adjustable pressure in the dough substantially greater than atmospheric under operation of said advancing means, while permitting continuous discharge of dough from the outlet, and means independent of said adjustable orifice for dividing said discharging dough into successive separate portions, said mixing means in the vessel having driving means therefor adjustable in speed independently of the pumping means.

7. In bread dough making apparatus, in combination, a pre-mixing vessel providing a horizontal path for advance of dough ingredients being mixed, said vessel having free communication between its interior and the atmosphere, a closed dough-developing vessel having inlet and outlet passages at opposite ends thereof, means including a pump and communicating with the pre-mixing vessel and the inlet end of the closed vessel, for positively advancing dough from the pre-mixing vessel to and under pressure through the closed vessel, and mixing means in the closed vessel having driving means therefor adjustable in speed independently of the pump, said mixing means being means for working the dough to develop it to substantially maximum extent as it advances therethrough, said pump comprising an input passage and structure engaging successive quantities of dough in said input passage for propelling said quantities into the inlet passage of and through the closed vessel to drive a substantially continuous flow of dough out of the outlet passage, said pre-mixing vessel comprising means for delivering dough continuously into said input passage under sufficient head to carry said dough directly and freely to said dough-engaging structure.

8. In bread dough making apparatus, in combination, a horizontally elongated pre-mixing vessel having an output end, means for mixing dough ingredients therein, and for advancing the mixed ingredients to the output end, dough developing means connected to said output end and including a dough-developing vessel and dough-working means therein, arranged to receive pre-mixed dough from the first vessel and adapted to discharge at least partially developed dough, means for supplying dough ingredients to the first vessel at localities remote from said outlet and, means controlled by the first vessel in accordance with the weight thereof, for regulating the ingredient-supply means to maintain a substantially constant supply of pre-mixed dough in said first vessel, and means disposed between the pre-mixing and developing vessels and controllable in speed independently of the aforesaid mixing and advancing means, for propelling the dough into, through and out of the developing vessel, said dough-working means in the developing vessel having driving means therefor adjustable in speed independently of the last-mentioned dough-propelling means.

9. Dough making apparatus as described in claim 8, wherein the first vessel is pivoted on a horizontal axis adjacent its outlet end and wherein the weight-controlled means comprises means associated with the first vessel at a locality remote from its said outlet end and responsive to the gravitational movement of said first vessel about its aforesaid pivotal mounting.

10. Dough making apparatus as described in claim 9, wherein the weight-controlled means comprises yieldable means exerting upward force on the vessel at said locality remote from its outlet end, for balancing the vessel at a predetermined content of dough material in the vessel, and cooperating means responsive to departure of said vessel at said locality in a predetermined direction from a position of balance, for controlling the operation of the ingredient-supply means so as to restore balance of the vessel about its pivots.

11. In bread dough making apparatus, in combination, an elongated pre-mixing vessel having an input end and an output end spaced lengthwise thereof, means for supplying dough ingredients to the vessel at the input end, mixing means in the vessel extending lengthwise thereof and adapted simultaneously to mix the dough ingredients and to advance the mixed ingredients to the output end, said pre-mixing vessel having its interior in communication with the atmosphere to maintain atmospheric pressure therein, dough advancing and developing means adapted to receive dough continuously from the output end of the pre-mixing vessel, and including a closed, dough-developing vessel having dough-working means therein, said dough advancing means comprising volumetric dough-propelling means connected between the ouput end of the pre-mixing vessel and the developing vessel for continuously advancing dough under pressure from the pre-mixing vessel into and through the developing vessel and out of the developing vessel as a substantially continuous flow of dough, said dough-working means in the developing vessel having driving means therefor adjustable in speed independently of the aforesaid volumetric dough-propelling means.

12. In bread dough making apparatus, in combination, a horizontally elongated pre-mixing vessel having free communication with the atmosphere and having input and output ends, means for supplying dough ingredients to the vessel at the input end, mixing means in the vessel adapted to combine the dough ingredients, without beating, into a homogeneous dough mixture, said mixing means including cyclically moved elements adapted to propel the mixed ingredients substantially continuously to the outlet end, closed dough developing means disposed to receive dough continuously from the outlet end of the pre-mixing vessel and confining the received dough under pressure, for working the dough to develop it and substantially continuously discharging developed dough, said dough-developing means comprising a closed chamber, dough-working means therein and a pump connected between the outlet end of the pre-mixing vessel and the said closed chamber, receiving dough from said outlet end and discharging into said chamber, for continuously advancing dough under pressure through the chamber, said pre-mixing vessel including dough-guiding means at its outlet end, said dough-guiding means and said propelling elements cooperating to compact the dough adjacent the outlet end, to maintain a continuously ample supply of pre-mixed dough for said pump, said dough-working means in the closed chamber having driving means therefor adjustable in speed independently of the said pump.

13. In bread dough making apparatus, in combination, an elongated pre-mixing vessel having free communication with the atmosphere and having input and output ends spaced lengthwise of the vessel, means for supplying dough ingredients to the vessel at the input end, mixing means in the vessel adapted to combine the dough ingredients, without beating, into a homogeneous dough mixture, said mixing means including cyclically moved elements adapted to propel the mixed ingredients substantially continuously to the outlet end, a closed dough-developing vessel having an inlet and an outlet and adapted to hold dough under pressure, mixing means in said second vessel including dough-working elements adapted to develop dough which is moving through said second vessel, to a substantially maximum extent, adjustable driving means for the said second mixing means, to operate the latter at a rate selectable to provide desired development in the dough, a pump receiving dough from the pre-mixing vessel and discharging into said second vessel, for continuously advancing dough into and through said second vessel under pressure, and out of the outlet of said second vessel, at a selected constant rate, and means including an adjustable valve in the outlet of said second vessel, for maintaining a selected pressure in the dough in said second vessel, said pump being connected between the output end of the pre-mixing vessel and the inlet of the dough-developing vessel, and said driving means for the said second mixing means being adjustable in speed independently of said pump.

14. A method of making bread dough comprising supplying pre-mixed dough composed of bread dough ingredients and having substantially uniform properties but lacking effective development, exerting propelling action on said pre-mixed dough at a controllable rate and by said propelling action continuously advancing said pre-mixed dough into and through a confined region while working said dough in said region sufficiently to produce substantially maximum gas-cell-retention properties in said dough and thereby to develop it to a substantially maximum extent, maintaining said region substantially filled with the dough under said propelling action, and by said propelling action discharging the developed dough from the confined region substantially as it is advanced therethrough, dividing the discharged dough into successive pieces by dividing operations succeeding each other at a predetermined rate, to provide a substantially continuous succession of said pieces, at least intermittently weighing succeeding pieces to detect departure of same from a predetermined uniform weight, and adjusting the rate of said propelling action to change the rate of advance of the dough through said region for restoring the weight of successive pieces to said uniform weight upon detection of such departure, said working of the dough as it traverses the confined region being effected at working rates adjustable independently of the advancing rate which has been preselected by the aforesaid control of the rate of propelling action, to provide the aforesaid development in the dough discharged from the confined region.

15. In bread dough making apparatus, in combination, means providing a supply of thoroughly combined, pre-mixed dough, a closed dough-developing vessel having an inlet and an outlet at respectively opposite ends thereof and adapted to hold dough under pressure, mixing means in said vessel including dough working elements respectively turning about a plurality of axes substantially parallel to the path of dough between said ends, for developing dough which is moving through said vessel, to a substantially maximum extent, a pump receiving dough from the supply means and discharging into said vessel, for continuously advancing dough into and through said vessel under pressure, and for driving the dough out of the outlet of said vessel as a substantially continuous flow of dough, at a selected constant rate, said outlet comprising an opening of size selected to maintain a desired pressure in the dough in the vessel, said mixing means in said vessel having driving means therefor adjustable in speed independently of the pump.

16. In bread dough making apparatus, in combination, a pre-mixing vessel having mixing means therein and an outlet and adapted to be supplied with dough ingredients, for continuously supplying pre-mixed dough in said outlet, a closed dough-developing vessel having dough-working means therein and having an inlet and outlet, a pump connected to and receiving dough from the outlet of the pre-mixing vessel and connected to and discharging dough into the inlet of the developing vessel, for continuously advancing dough through and out of the developing vessel, means for adjusting the speed of the pump, to change the rate of dough advance through and out of the developing vessel, said pre-mixing vessel having means sensitive to the weight of the contents thereof to control the supply of ingredients to said pre-mixing vessel, for automatically regulating said last-mentioned supply in accordance with changes in speed of the pump, said dough-working means in the developing vessel having driving means therefor adjustable in speed independently of the pump.

17. In a method of making bread dough, the steps of supplying bread dough material comprising flour, water, and yeast material including products of yeast activity and yeast adapted to remain active in the dough, continuously advancing said dough material at a selected rate into, through and out of a confined developing region, said advancement of the dough both into and out of said region being governed by force on the dough material causing it to enter the region, and said advancement of the dough being effective to keep the region substantially filled with dough by said force, and continuously working the dough to develop it as it traverses said region, at working rates adjustable independently of the preselected advancing rate, to provide an amount of working of the dough which is effective for constituting the dough discharged from the region as an active-yeast-containing bread dough having effective and substantially uniform development.

18. In a method of making bread dough, supplying the material for bread dough, including active yeast and products of yeast activity, applying propelling force to said material for advancing it at a selected rate continuously into and through a confined developing region and out of said region as a substantially continuous stream of developed dough capable of expansion by yeast activity on proofing, said advancement of the dough maintaining the said region substantially filled with dough under pressure by said propelling force, and continuously working the dough as it traverses said region, at working rates adjustable independently of the preselected advancing rate, to provide an amount of working of the dough which is sufficient to produce substantially maximum gas-cell-retention properties in the departing dough stream, and thereby to produce effective and substantially uniform development in said dough stream.

19. A method of making bread dough, comprising continuously supplying bread dough ingredients, including active yeast, to a pre-mixing path, advancing the ingredients along said path while mixing the ingredients and maintaining the mixture substantially unconfined, to produce a pre-mixed dough lacking effective development but having substantially uniform properties including substantially uniform content of free gas, continuously advancing said pre-mixed dough, substantially as it is produced, at a selected rate into, through and out of a confined developing region, for substantially continuous discharge of the active-yeast-containing dough from said region, and continuously working the dough as it traverses said region, at working rates adjustable independently of the preselected advancing rate, to provide an amount of working of the dough which is sufficient to impart to the dough leaving said region substantially greater gas-cell-retention properties than in the pre-mixed dough, and thereby to produce effective and substantially uniform development in the dough leaving said region.

20. A method of making bread dough, comprising continuously supplying bread dough ingredients, including flour, salt, water, active yeast and an improving agent, to a pre-mixing path, advancing the ingredients along said path while mixing the ingredients and maintaining the mixture substantially unconfined, to produce a pre-mixed dough lacking effective development but having substantially uniform properties including substantially uniform content of free gas, continuously advancing said dough at a selected rate into, through and out of a confined developing region while maintaining said region substantially filled with the advancing dough, said advancement of the dough being effective to maintain the dough under pressure in said region, and continuously working the dough as it traverses said region, at working rates adjustable independently of the preselected advancing rate, to provide an amount of working of the dough which is effective to provide effective and substantially uniform development in the dough leaving said region.

21. A method of making bread dough, comprising continuously supplying bread dough ingredients, including active yeast, to a pre-mixing path, advancing the ingredients along said path while mixing the ingredients and maintaining the mixture substantially unconfined, to produce a pre-mixed dough lacking effective development but having substantially uniform properties including substantially uniform content of free gas, applying propelling force to said pre-mixed dough for advancing it at a selected rate continuously into one end of and through a confined developing region and out of the other end of said region as a substantially continuous stream of developed dough capable of expansion by yeast activity on proofing, said advancement of the dough maintaining the said region substantially filled with dough under pressure by said propelling force, and continuously working the dough as it traverses said region, at working rates adjustable independently of the preselected advancing rate, to provide an amount of working of the dough which is effective to provide effective and substantially uniform development in the departing dough stream, said working operation comprising physically working the advancing dough in said region to a sufficient extent to impart to the departing dough substantially greater gas-cell-retention properties than in the pre-mixed dough.

22. In a method of making bread dough, the steps of supplying pre-mixed bread dough lacking effective development and comprising bread dough ingredients including active yeast, said pre-mixed dough having substantially uniform properties including a substantially uniform content of free gas, continuously advancing said pre-mixed dough into, through and out of a confined developing region at a selected rate, said pre-mixed dough introducing the gas which is distributed in it into said region, continuously working the dough as it traverses said region, at working rates adjustable independently of the preselected advancing rate, to provide an amount of working of the dough which is effective to provide effective and substantially uniform development and substantially uniform distribution of gas cells in the dough leaving said region, and the total amount of gas introduced into said region and the pressure in the dough in said region being such as to provide in the discharged, developed dough a total amount of free and immediately releasable dissolved gas which is insufficient to afford immediate expansion of the dough to a condition suitable for baking into bread.

23. In bread dough making apparatus, in combination, a closed vessel having an inlet and an outlet mutually spaced to provide a substantially linear path for dough through the vessel from one end to the other of the vessel, said vessel having wall structure parallel to said path for defining the same, mixing means in the vessel for working the dough which traverses said path, to effect substantially maximum development thereof, said mixing means comprising a plurality of mutually spaced shaft means extending into the vessel on axes parallel to said path, each of said shaft means carrying impeller blades each of which extends lengthwise of the vessel parallel to said path, means for turning said shaft means so that the impeller blades of each shaft means are continuously turned relative to the impeller blades of the other shaft means, dough-propelling means connected to said inlet for continuously advancing dough material into said vessel under pressure and for thereby advancing dough continuously through the vessel and out of the outlet as a substantially continuous flow of dough, said outlet being arranged in cooperation with said dough-propelling means to maintain pressure in the dough while it advances through the vessel.

24. Dough making apparatus as described in claim 23 in which the shaft means are disposed so that the path of the impeller blades on one intersects the path of the impeller blades on the other, the blades on each having substantially the same radial dimension and the axes of the shafts being spaced by a distance only slightly greater than said dimension so that the blades overlap deeply as they are turned relative to each other by the shaft means.

25. In a method of making bread dough, supplying the material for bread dough, applying propelling force to said material for displacing it continuously at a selected rate while directing the material into, through and out of a confined developing region, said material being advanced at said rate by said force continuously into and out of said region, and said advancement of the material maintaining the region substantially filled with the material by said propelling force, and continuously working the dough material as it traverses said developing region, at working rates adjustable independently of the preselected advancing rate, to provide an amount of working of the dough which is effective to constitute the dough discharged from the region as bread dough having effective and substantially uniform development.

26. In a method of making bread dough, the steps of establishing a continuously available supply of pre-mixed dough composed of thoroughly combined bread dough ingredients and having substantially uniform properties but lacking effective development, applying propelling force to said pre-mixed dough from said supply for displacing it continuously at a selected rate while directing said dough into, through and out of a confined developing region, said dough being advanced at said rate by said force continuously into and out of said region, and said advancement of the dough maintaining the region substantially filled with the dough by said propelling force, and continuously working the dough to develop it in said region, to constitute the dough discharged from the region as bread dough having effective and substantially uniform development, said working operation comprising physically working the advancing dough to a sufficient extent to impart to said discharged dough substantially greater gas-cell-retention properties than in the pre-mixed dough, said working operation being effected as the dough traverses said region, at working rates adjustable independently of the preselected advancing rate, to provide the amount of working of the dough which is effective to achieve said effective and substantially uniform development in the discharged dough.

27. A method of making bread dough as defined in claim 20, wherein the continuously supplied bread dough ingredients comprise fermented broth containing products of yeast activity and containing yeast which is adapted to remain active in the dough for gas generation and which provides the requirements of the dough for active yeast, and wherein the aforesaid working of the dough in said confined region consists in physically working the advancing dough to a sufficient extent to impart to the dough leaving the region substantially greater gas-cell-retention properties than in the pre-mixed dough and to establish a uniform gas-cell distribution in said dough leaving the region.

28. A method of making bread dough as defined in claim 21, wherein the working operation comprises physically working the dough with movements transverse of the dough path to provide said gas-cell-retention properties and to establish a uniform gas-cell distribution in the dough discharged from the confined developing region.

29. A method of making bread dough, comprising continuously supplying bread dough ingredients to a pre-mixing zone, continuously mixing the supplied ingredients in said zone to effect thorough combination thereof and by said mixing converting the ingredients into a continuously formed and continuously available supply of pre-mixed dough having the ingredients thoroughly combined and having substantially uniform properties but lacking effective development, continuously advancing said dough, into, through and out of a confined developing region while maintaining said region substantially filled with the advancing dough, and continuously working the dough to develop it as it traverses said region, said working operation comprising physically working the advancing dough to a sufficient extent to impart to the dough discharged from the region substantially greater gas-cell-retention properties than in the pre-mixed dough, the aforesaid bread dough ingredients supplied to the pre-mixing zone comprising flour and fermented broth containing products of yeast activity and containing yeast which is adapted to remain active in the dough for gas generation and which provides the requirements of the dough for active yeast, said step of advancing the dough consisting in applying pumping action to the pre-mixed dough intermediate the pre-mixing zone and the confined region to propel said pre-mixed dough, substantially as it is produced, into, through and out of the confined region, under pressure and at a selected rate, and said working of the dough being effected at working rates adjustable independently of the preselected advancing rate, to provide an amount of working of the dough which is effective to provide effective development, including the aforesaid gas-cell-retention properties, in the dough discharged from said region.

30. A method of making bread dough, comprising continuously supplying bread dough ingredients in predetermined proportions to a pre-mixing zone, continuously mixing the supplied ingredients in said zone to effect thorough combination thereof while inhibiting entrapment of gas with the ingredients, and by said mixing converting the ingredients into a continuously formed, pre-mixed dough having a constant predetermined density but lacking effective development, continuously advancing said dough into, through and out of a confined developing region while maintaining said region substantially filled with the advancing dough under pressure, and continuously working the dough to develop it to a substantially maximum extent as it traverses said region, said working step consisting in physically working the dough material in said confined region by continuous mixing action forcibly producing strain in the dough material, in co-action with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially maximum gas-cell retention properties therein.

31. A method of making bread dough comprising establishing a continuously available supply of pre-mixed dough composed of bread dough ingredients and having substantially uniform properties but lacking effective development, and continuously advancing said pre-mixed dough from said supply through a confined region while working said dough in said region to develop it and while maintaining said region substantially filled with said advancing dough under pressure greater than atmospheric, said advancing step comprising applying propelling force to the dough before it enters said confined region, and by said force continuously discharging dough from said region, said working operation being effected at a rate to provide a constant, effective development in the discharged dough, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially greater gas-cell-retention properties therein than in the pre-mixed dough.

32. In a method of making bread dough, supplying the material for bread dough, applying propelling force to said material for displacing it continuously at a selected rate while directing the material into, through and out of a confined developing region, said material being advanced at said rate by said force continuously into and out of said region, and said advancement of the material maintaining the region substantially filled with the material by said propelling force, and converting the material traversing said region into developed dough by working it under pressure in said region to an extent providing effective and substantially uniform development in the dough leaving the region, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region so as to have no appreciable effect in propelling the dough material from said inlet to said outlet, and regulating the working step to control the application of dough-developing energy in said working, for achievement of development in the discharged dough, to obtain substantially maximum gas-cell-retention properties therein.

33. In a method of making bread dough, supplying the material for bread dough, advancing said material continuously into one end of, through, and out of the other end of a confined developing region, while maintaining said region substantially filled with dough material by said advancement of said dough material into the region, and converting the material traversing said region into developed dough by working it under pressure in said region with movements transverse of the dough path, to an extent providing effective and substantially uniform development in the dough leaving the region, said transverse working movements being sufficient to produce, in the time of travel of the dough material through the region, substantially maximum gas-cell-retention properties in the discharged dough, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain said substantially maximum gas-cell-retention properties therein.

34. A method of making bread dough, comprising continuously supplying bread dough ingredients to a pre-mixing zone, continuously mixing the supplied ingredients in said zone to effect thorough combination thereof and by said mixing converting the ingredients into a continuously formed and continuously available supply of pre-mixed dough having the ingredients thoroughly combined and having substantially uniform properties but lacking effective development, continuously advancing said dough, into, through and out of a confined developing region while maintaining said region substantially filled with the advancing dough under pressure, and continuously working the dough to develop it as it traverses said region, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially greater gas-cell-retention properties therein than in the pre-mixed dough.

35. A method of making bread dough, comprising supplying bread dough ingredients, including active yeast to a pre-mixing path, continuously advancing said supplied ingredients along said path while mixing said ingredients to effect thorough combination thereof and by said mixing converting the ingredients into a continuously formed and continuously available supply of pre-mixed dough having the ingredients thoroughly combined and having substantially uniform properties but lacking effective development, continuously advancing said dough at a selected rate, into, through and out of a confined developing region by applying propelling force to said dough to displace it into said region and while maintaining said region substantially filled with the advancing dough and maintaining the dough under pressure in said region by said application of propelling force, and working the dough to develop it as it traverses said region, to constitute the dough continuously discharged from the region as an effectively developed, active-yeast-containing dough capable of expansion by yeast activity on proofing, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially greater gas-cell-retention properties therein than in the pre-mixed dough.

36. In a method of making bread dough, the steps of establishing a continuously available supply of pre-mixed dough composed of thoroughly combined bread dough ingredients and having substantially uniform properties but lacking effective development, applying propelling force to said pre-mixed dough from said supply for displaceing it continuously at a selected rate while directing said dough into, through and out of a confined developing region, said dough being advanced at said rate by said force continuously into and out of said region, and said advancement of the dough maintaining the region substantially filled with the dough under pressure by said propelling force, and continuously working the dough to develop it in said region, to constitute the dough discharged from the region as bread dough having effective and substantially uniform development, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially greater gas-cell-retention properties therein than in the pre-mixed dough.

37. In a method of making bread dough, the steps of establishing a continuously available supply of pre-mixed dough composed of thoroughly combined bread dough ingredients and having substantially uniform properties but lacking effective development, said pre-mixed dough comprising flour, water and yeast material including products of yeast activity and yeast adapted to remain active in the dough, continuously advancing said pre-mixed dough into one end of, through and out of the other end of a confined developing region, said advancement of the dough both into and out of said region being governed by force on the dough material causing it to enter the region, and said advancement of the dough being effective to keep the region substantially filled with dough by said force, and converting the material traversing said region into developed dough by working it under pressure in said region with movements transverse of the dough path, to provide effective and substantially uniform development in the dough discharged from the region, said working step consisting in physically working the dough material in said confined region by continuous mixing action forcibly producing strain in the dough material, in coaction with the pressure under which the dough is maintained in said region, said mixing action being performed with forces effective to circulate the dough material substantially only crosswise of its direction of flow between inlet and outlet of the region, so as to have no appreciable effect in propelling the dough material from said inlet to said outlet, and regulating the working step to control the application of dough-developing energy in said working, for achievement of development in the discharged dough, to obtain substantially greater gas-cell-retention properties therein than in the pre-mixed dough.

38. A method of making bread dough as defined in claim 35, wherein the bread dough ingredients supplied to the pre-mixing path comprise flour and fermented broth containing products of yeast activity and containing yeast which is adapted to remain active in the dough for gas generation and which provides the requirements of the dough for active yeast.

39. A method as defined in claim 25, in which the step of supplying the material for bread dough comprises continuously supplying bread dough ingredients, including active yeast, to a pre-mixing path, continuously advancing said supplied ingredients along said path while mixing said ingredients to effect thorough combination thereof and by said mixing converting the ingredients into a continuously formed and continuously available supply of pre-mixed dough having the ingredients thoroughly combined and having substantially uniform properties but lacking effective development, said pre-mixed dough being the bread dough material supplied as aforesaid and being advanced continuously as aforesaid, under pressure, into and through the confined developing region.

References Cited in the file of this patent

UNITED STATES PATENTS

| Number | Name | Date |
|---|---|---|
| Re. 1,524 | Fitzgerald | Aug. 18, 1863 |
| 19,610 | Perry et al. | Mar. 9, 1858 |
| 33,432 | Fitzgerald | Oct. 8, 1861 |
| 35,837 | Perry | July 8, 1862 |
| 45,706 | Fitzgerald | Jan. 3, 1865 |
| 51,659 | Moxey | Dec. 19, 1865 |
| 96,804 | Mawkins | Nov. 16, 1869 |
| 476,320 | Shepherd | June 7, 1892 |
| 598,404 | Weichert | Feb. 1, 1898 |
| 617,866 | Somasco | Jan. 17, 1899 |
| 675,598 | Haworth | June 4, 1901 |
| 730,104 | Ferguson | June 2, 1903 |
| 734,847 | Garrick | July 28, 1903 |
| 774,680 | Lynds | Nov. 6, 1904 |
| 904,573 | Temple | Nov. 24, 1908 |
| 970,826 | Hoyt | Sept. 20, 1910 |
| 1,041,278 | Hayssen | Oct. 15, 1912 |
| 1,044,967 | Aeschbach | Nov. 19, 1912 |
| 1,069,771 | Dougan | Aug. 12, 1913 |
| 1,148,328 | Kohman | July 27, 1915 |
| 1,641,448 | Merrick | Sept. 6, 1927 |
| 1,669,962 | Wihlfahrt | May 15, 1928 |
| 1,700,510 | Oches | Jan. 29, 1929 |
| 1,725,036 | Wihlfahrt | Aug. 20, 1929 |
| 1,780,067 | Cox | Oct. 28, 1930 |
| 1,781,435 | Carper | Nov. 11, 1930 |
| 1,790,347 | Hawkins | Jan. 27, 1931 |
| 1,799,520 | Lauterbur et al. | Apr. 7, 1931 |
| 1,907,836 | Lauterbur et al. | May 9, 1933 |
| 1,919,878 | Brownlee | July 25, 1933 |
| 1,922,784 | Sheriff et al. | Aug. 15, 1933 |
| 1,936,636 | MacIntosh | Nov. 28, 1933 |
| 2,148,178 | Shropshire | Feb. 21, 1939 |
| 2,201,212 | Valentine | May 21, 1940 |
| 2,206,237 | Roberts | July 2, 1940 |
| 2,253,770 | Duffy | Aug. 26, 1941 |
| 2,326,134 | Freilich | Aug. 10, 1943 |
| 2,478,043 | Evans | Aug. 2, 1949 |
| 2,491,408 | Deventer | Dec. 13, 1949 |
| 2,492,588 | Marhofter | Dec. 27, 1949 |
| 2,524,437 | Garnatz | Oct. 3, 1950 |
| 2,547,566 | Cohoe | Apr. 3, 1951 |
| 2,558,449 | Maranz | June 26, 1951 |
| 2,578,118 | Wood | Dec. 11, 1951 |
| 2,626,786 | McGlothin | Jan. 27, 1953 |

FOREIGN PATENTS

| Number | Country | Date |
|---|---|---|
| 331,293 | Germany | Jan. 5, 1921 |
| 627,274 | Germany | Mar. 11, 1936 |
| 32,248 | France | May 10, 1927 |
| 611,369 | France | July 5, 1926 |
| 243,592 | Switzerland | Jan. 16, 1947 |

OTHER REFERENCES

Federal Register, Aug. 8, 1950, pp. 5110 and 5111.

UNITED STATES PATENT OFFICE
CERTIFICATION OF CORRECTION

Patent No. 2,953,460                   September 20, 1960

John C. Baker

It is hereby certified that error appears in the above numbered patent requiring correction and that the said Letters Patent should read as corrected below.

Column 1, line 22, for "delievered" read -- delivered --; line 54, for "soft-boiled" read -- soft-bodied --; line 64, for "bead" read -- bread --; column 2, line 34, for "establish" read -- reestablish --; line 70, strike out "and", first occurrence; column 7, line 40, for "which" read -- with --; line 69, for "thruoghout" read -- throughout --; column 8, line 68, for "is", second occurrence, read -- it --; column 9, line 22, for "expalined" read -- explained --; column 12, line 38, for "esentially" read -- essentially --; line 74, strike out "and", first occurrence; column 15, line 53, strike out "and"; column 21, line 69, for "mining" read -- mixing --; column 29, line 19, for "simyply" read -- simply --; line 48, for "sponse" read -- sponge --; column 33, line 33, for "of", second occurrence, read -- or --; column 35, line 29, for "prcess" read -- process --; column 38, line 10, for "bead" read -- bread --; column 50, line 69, for "displaceing" read -- displacing --; column 52, line 17, list of references cited, under "UNITED STATES PATENTS", for "Mawkins" read -- Hawkins --; line 24, for "Nov. 6, 1904" read -- Nov. 8, 1904 --.

Signed and sealed this 18th day of July 1961.

(SEAL)
Attest:

ERNEST W. SWIDER
Attesting Officer

DAVID L. LADD
Commissioner of Patents